(12) United States Patent
Kaneda

(10) Patent No.: US 9,258,482 B2
(45) Date of Patent: Feb. 9, 2016

(54) FACIAL EXPRESSION RECOGNITION APPARATUS, IMAGE SENSING APPARATUS, FACIAL EXPRESSION RECOGNITION METHOD, AND COMPUTER-READABLE STORAGE MEDIUM

(71) Applicant: CANON KABUSHIKI KAISHA, Tokyo (JP)

(72) Inventor: Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/831,131

(22) Filed: Aug. 20, 2015

(65) Prior Publication Data

US 2015/0356348 A1 Dec. 10, 2015

Related U.S. Application Data

(63) Continuation of application No. 14/287,441, filed on May 27, 2014, now Pat. No. 9,147,107, which is a continuation of application No. 12/936,227, filed as application No. PCT/JP2009/057029 on Mar. 31, 2009, now Pat. No. 8,780,221.

(30) Foreign Application Priority Data

Apr. 9, 2008 (JP) ................................. 2008-101818

(51) Int. Cl.
*H04N 5/232* (2006.01)
*G06K 9/00* (2006.01)
*H04N 21/442* (2011.01)

(52) U.S. Cl.
CPC ........ *H04N 5/23219* (2013.01); *G06K 9/00221* (2013.01); *G06K 9/00248* (2013.01); *G06K 9/00268* (2013.01); *G06K 9/00281* (2013.01); *G06K 9/00302* (2013.01); *G06K 9/00335* (2013.01); *H04N 21/44218* (2013.01)

(58) Field of Classification Search
CPC ................... H04N 21/44218; H04N 5/23219; G06K 9/0021; G06K 9/00335; G06K 9/00597
USPC ...................................................... 348/222.1
See application file for complete search history.

(56) References Cited

U.S. PATENT DOCUMENTS

| | | |
|---|---|---|
| 6,088,040 A | 7/2000 | Oda et al. |
| 2004/0218916 A1 | 11/2004 | Yamaguchi et al. |
| 2006/0115157 A1 | 6/2006 | Mori et al. |

(Continued)

FOREIGN PATENT DOCUMENTS

| | | |
|---|---|---|
| JP | 10-091808 | 4/1998 |
| JP | 10-228295 | 8/1998 |
| JP | 11-232456 | 8/1999 |
| JP | 2004-046591 | 2/2004 |
| JP | 2004-294498 | 10/2004 |
| JP | 2005-056387 | 3/2005 |
| JP | 2005056388 | 3/2005 |
| JP | 2005-199403 | 7/2005 |
| JP | 2005-234686 | 9/2005 |
| JP | 2006-237803 | 9/2006 |
| JP | 2006-289508 | 10/2006 |
| JP | 2009-033491 | 2/2009 |
| WO | 2007129438 A1 | 11/2007 |

*Primary Examiner* — Nelson D. Hernández Hernández
(74) *Attorney, Agent, or Firm* — Fitzpatrick, Cella, Harper & Scinto

(57) ABSTRACT

A facial expression recognition apparatus (10) detects a face image of a person from an input image, calculates a facial expression evaluation value corresponding to each facial expression from the detected face image, updates, based on the face image, the relationship between the calculated facial expression evaluation value and a threshold for determining a facial expression set for the facial expression evaluation value, and determines the facial expression of the face image based on the updated relationship between the facial expression evaluation value and the threshold for determining a facial expression.

10 Claims, 20 Drawing Sheets

(56) References Cited

U.S. PATENT DOCUMENTS

| | | |
|---|---|---|
| 2007/0195174 A1 | 8/2007 | Oren |
| 2008/0118156 A1* | 5/2008 | Okada .......................... 382/195 |
| 2008/0260212 A1 | 10/2008 | Moskal et al. |
| 2009/0273667 A1 | 11/2009 | Nozaki et al. |
| 2010/0189358 A1 | 7/2010 | Kaneda et al. |

* cited by examiner

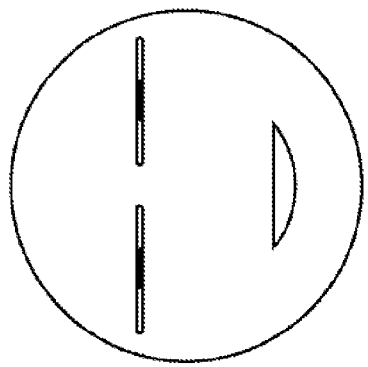
FIG. 1A SUCCESSFUL IMAGE
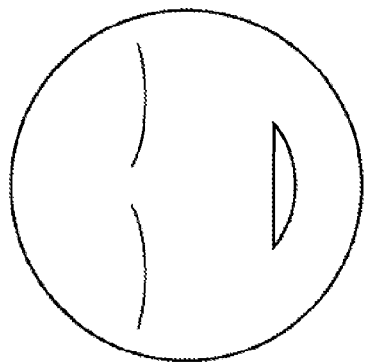
FIG. 1B FAILED IMAGE 1
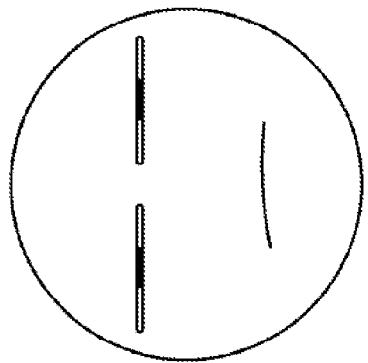
FIG. 1C FAILED IMAGE 2
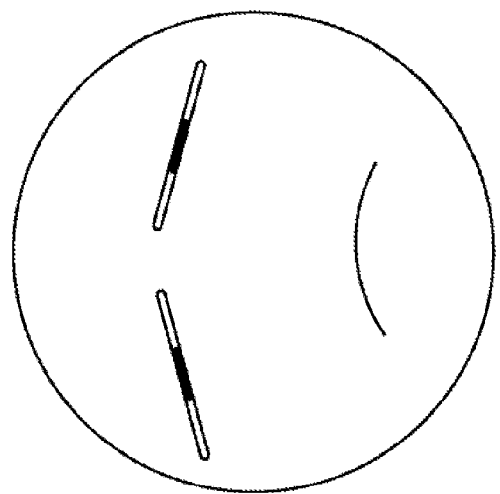
FIG. 2

FIG. 21

| PERSON | |
|---|---|
| A | B |
| DETECTING HISTORY | |
| CRYING FACIAL EXPRESSION : 30 TIMES | CRYING FACIAL EXPRESSION : 10 TIMES |
| EMBARRASSING FACIAL EXPRESSION : 0 TIMES | EMBARRASSING FACIAL EXPRESSION : 20 TIMES |
| PRIORITY | |
| CRYING FACIAL EXPRESSION : 1.3 | CRYING FACIAL EXPRESSION : 1 |
| EMBARRASSING FACIAL EXPRESSION : 0.8 | EMBARRASSING FACIAL EXPRESSION : 1.2 |

2000

| AGE GROUP | | |
|---|---|---|
| 0 TO 10 YEARS | 10 TO 20 YEARS | 20 TO 30 YEARS |
| PRIORITY | | |
| CRYING FACIAL EXPRESSION : 1.2 | CRYING FACIAL EXPRESSION : 1.1 | CRYING FACIAL EXPRESSION : 1.0 |
| EMBARRASSING FACIAL EXPRESSION : 0.8 | EMBARRASSING FACIAL EXPRESSION : 1.0 | EMBARRASSING FACIAL EXPRESSION : 1.1 |

2001

| SEX | |
|---|---|
| MALE | FEMALE |
| PRIORITY | |
| CRYING FACIAL EXPRESSION : 0.9 | CRYING FACIAL EXPRESSION : 1.2 |
| EMBARRASSING FACIAL EXPRESSION : 1.2 | EMBARRASSING FACIAL EXPRESSION : 1.0 |

2002

FACIAL EXPRESSION RECOGNITION APPARATUS, IMAGE SENSING APPARATUS, FACIAL EXPRESSION RECOGNITION METHOD, AND COMPUTER-READABLE STORAGE MEDIUM

TECHNICAL FIELD

The present invention relates to a facial expression recognition apparatus, an image sensing apparatus, a facial expression recognition method, and a computer-readable storage medium.

BACKGROUND ART

Conventionally, there is known a technique of detecting faces from images including still images and moving images (non-patent reference 1: Yusuke Mitarai, Katsuhiko Mori, and Masakazu Matsugu, "Robust Face Detection System Based on Convolutional Neural Networks Using Selective Activation of Modules", FIT (Forum of Information Technology), L1-013, 2003). A technique of determining the facial expression of the detected face is also known (Japanese Patent Laid-Open No. 2005-056388).

In association with this technique, Japanese Patent Laid-Open No. 11-232456 refers to a technique of discriminating each facial expression from a moving image including a plurality of facial expressions. Japanese Patent Laid-Open No. 10-228295 also refers to a technique of determining a facial expression by weighting sounds in association with fear and sadness and by weighting images in associating with joy and surprise. Japanese Patent Laid-Open No. 10-91808 refers to a technique of creating a facial expression by synthesizing a facial expression in accordance with the ratios between expressionlessness and other facial expressions. Japanese Patent Laid-Open No. 2005-199403 also refers to a technique of estimating the emotion of a person by weighting outputs from various types of sensors such as a camera and a microphone.

Japanese Patent Laid-Open No. 2004-46591 refers to a technique of calculating, for example, the degree of smile and the degree of decency, and displaying an evaluation on the degree of smile in preference to an evaluation on the degree of decency when an image is captured in a casual scene. In addition, Japanese Patent Laid-Open No. 2006-289508 refers to a technique of creating facial expressions upon providing facial expressions with high and low priorities.

Although various types of techniques of recognizing the facial expressions of persons have been proposed, there are still problems unsolved. For example, even different facial expressions have parts with similar shapes, for example, eyes and mouths, and hence it is impossible to properly recognize facial expressions, resulting in a recognition error. Such a recognition error occurs in discriminating a state in which the cheek muscle of a person moves up when he/she smiles as shown in FIG. 1A and a state in which the eyes of the person are half closed when he/she blinks his/her eyes as shown in FIG. 1C. In this case, both the facial expressions have short distances between the upper and lower eyelids and similar eye shapes. This makes it difficult to discriminate the facial expressions.

For this reason, if, for example, an image sensing apparatus such as a digital camera is equipped with a technique of detecting the facial expression of a face (e.g., the shapes of the eyes) to determine the images shown in FIG. 1B and FIG. 1C as eye closed images, even the image shown in FIG. 1A may be mistaken as a failed image, resulting in a non-captured image. Assume that when a person fully opens his/her eyes, it is determined that he/she is smiling. In this case, it is possible that even the image shown in FIG. 2 be captured.

It is very difficult to determine the image shown in FIG. 2 as a crying face or an embarrassed face, because there are individual differences. Under the circumstances, assume that a facial expression is determined based on the maximum value of facial expression evaluation values output from a plurality of discriminators. In this case, since evaluation values on crying facial expressions are often slightly higher than those on embarrassed facial expressions, it is possible that even an actually embarrassed facial expression is determined as a crying facial expression. In the case of infants, the probability of crying facial expressions is overwhelmingly high. It is possible, however, that a crying facial expression is erroneously determined as an embarrassed facial expression.

Furthermore, in an arrangement designed to uniformly perform calculation for facial expression evaluation values on each facial expression in facial expression determination, calculation for facial expression evaluation values on a plurality of facial expressions is performed for even a face with his/her eyes obviously looking closed, as shown in FIG. 1B, resulting in wasteful processing.

DISCLOSURE OF INVENTION

The present invention enables to provide a facial expression recognition apparatus, image sensing apparatus, facial expression recognition method, and computer-readable storage medium which can accurately recognize facial expressions even if parts such as eyes and mouths have similar shapes.

According to a first aspect of the present invention, there is provided a facial expression recognition apparatus characterized by comprising: image input means for inputting an image; face detection means for detecting a face image of a person from an image input by the image input means; calculation means for calculating a facial expression evaluation value corresponding to each facial expression from a face image detected by the face detection means; updating means for updating, based on the face image, a relationship between a facial expression evaluation value calculated by the calculation means and a threshold for determining a facial expression set for the facial expression evaluation value; and determination means for determining a facial expression of the face image based on the relationship between the facial expression evaluation value and the threshold for determining a facial expression which is updated by the updating means.

According to a second aspect of the present invention, there is provided an image sensing apparatus characterized by comprising: image input means for inputting an image; face detection means for detecting a face image of a person from an image input by the image input means; calculation means for calculating a facial expression evaluation value corresponding to each facial expression from a face image detected by the face detection means; updating means for updating, based on the face image, a relationship between a facial expression evaluation value calculated by the calculation means and a threshold for determining a facial expression set for the facial expression evaluation value; determination means for determining a facial expression of the face image based on the relationship between the facial expression evaluation value and the threshold for determining a facial expression which is updated by the updating means; and image sensing means for performing image capturing based on the facial expression of the face image determined by the determination means.

According to a third aspect of the present invention, there is provided an image sensing apparatus characterized by comprising: image input means for inputting an image; face detection means for detecting a face image of a person from an image input by the image input means; calculation means for calculating a facial expression evaluation value corresponding to each facial expression from a face image detected by the face detection means; and image sensing means for performing image capturing based on a relationship between facial expression evaluation values respectively corresponding to a first facial expression and a second facial expression, which are calculated by the calculation means, and a threshold for determining a facial expression set for the each facial expression evaluation value.

According to a fourth aspect of the present invention, there is provided a facial expression recognition method in a facial expression recognition apparatus, characterized by comprising: an image input step of inputting an image; a face detection step of detecting a face image of a person from an image input in the image input step; a calculation step of calculating a facial expression evaluation value corresponding to each facial expression from a face image detected in the face detection step; an updating step of updating, based on the face image, a relationship between a facial expression evaluation value calculated in the calculation step and a threshold for determining a facial expression set for the facial expression evaluation value; and a determination step of determining a facial expression of the face image based on the relationship between the facial expression evaluation value and the threshold for determining a facial expression which is updated in the updating step.

According to a fifth aspect of the present invention, there is provided a computer-readable storage medium storing a facial expression recognition program for causing a computer to function as face detection means for detecting a face image of a person from an image, calculation means for calculating a facial expression evaluation value corresponding to each facial expression from a face image detected by the face detection means, updating means for updating, based on the face image, a relationship between a facial expression evaluation value calculated by the calculation means and a threshold for determining a facial expression set for the facial expression evaluation value, and determination means for determining a facial expression of the face image based on the relationship between the facial expression evaluation value and the threshold for determining a facial expression which is updated by the updating means.

Further features of the present invention will be apparent from the following description of exemplary embodiments with reference to the attached drawings.

BRIEF DESCRIPTION OF DRAWINGS

FIGS. 1A to 1C are first views showing an example of images each including a face;

FIG. 2 is a second view showing an example of an image including a face;

FIG. 21 is a view showing outlines of a history table and priority information tables (for individuals, ages, and sexes);

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 3:
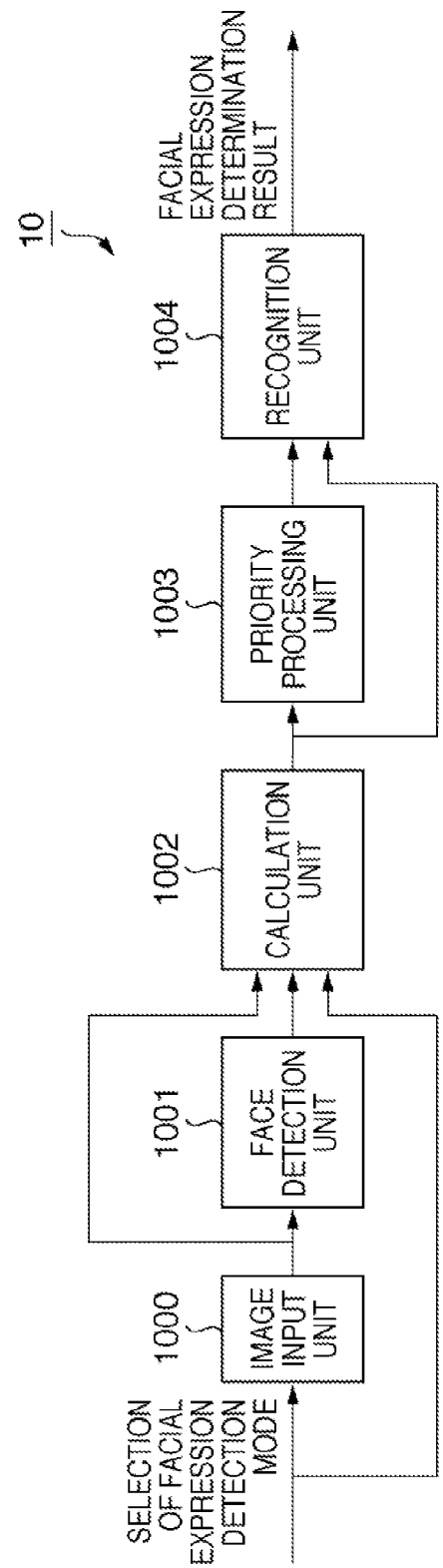
FIG. 3 is a block diagram showing an example of the arrangement of a facial expression recognition apparatus 10 according to an embodiment of the present invention.

The first embodiment will be described first. FIG. 3 is a block diagram showing an example of the arrangement of a facial expression recognition apparatus 10 according to an embodiment of the present invention.

The facial expression recognition apparatus 10 incorporates a computer. The computer includes a main control unit such as a CPU and storage units such as a ROM (Read Only Memory) and a RAM (Random Access Memory). The computer also includes various buttons, an input/output unit such as a display or a touch panel, and a communication unit such as a network card. Note that these constituent elements are connected via a bus or the like and are controlled by making the main control unit execute the programs stored in the storage unit.

The facial expression recognition apparatus 10 includes, as its functional constituent elements, an image input unit 1000, a face detection unit 1001, a calculation unit 1002, a priority processing unit 1003, and a recognition unit 1004. Some or all of these functional constituent elements can be implemented by making the CPU execute the programs (e.g., a facial expression recognition program) stored in the memory or the like. Note that these constituent elements can also be implemented by hardware.

The image input unit 1000 is formed by an image sensing apparatus including lenses, an image sensor such as a CMOS sensor or a CCD, an analog/digital (A/D) converter, and an image processing circuit. The image input unit 1000 generates an image signal and inputs it as a digital image (to be simply referred to as an image hereinafter). The image input unit 1000 inputs, for example, an image including the face of a person. Note that images are data including still images and moving images.

The face detection unit 1001 detects the face of a person from an input image. This face detection can be performed by using a predetermined algorithm. As the predetermined algorithm, for example, a convolutional neural network is known, which hierarchically detects features including low-order features such as edges and high-order features such as eyes and a mouth and finally detects the barycentric position of the face (Yusuke Mitarai, Katsuhiko Mori, and Masakazu Matsugu, "Robust Face Detection System Based on Convolutional Neural Networks Using Selective Activation of Modules", FIT (Forum of Information Technology), L1-013, 2003). Using a convolutional neural network makes it possible to obtain the barycentric position of an eye or mouth.

Figure 4:
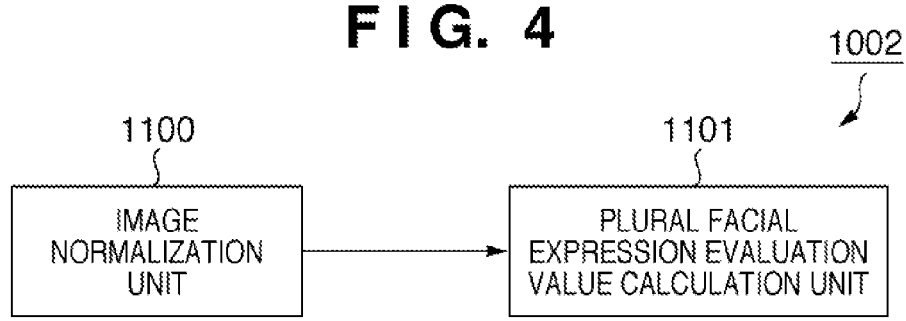
FIG. 4 is a block diagram showing an example of the arrangement of a calculation unit 1002 shown in FIG. 3.

The calculation unit 1002 calculates a facial expression evaluation value corresponding to each facial expression on the basis of the face detected by the face detection unit 1001. It suffices to use a predetermined algorithm for the calculation of a facial expression evaluation value. The calculation unit 1002 functions only when the facial expression recognition apparatus 10 operates in a facial expression detection mode. Assume that in this embodiment, the facial expression detection mode is selected. As shown in FIG. 4, the calculation unit 1002 includes an image normalization unit 1100 and a plural facial expression evaluation value calculation unit 1101.

Figure 5:
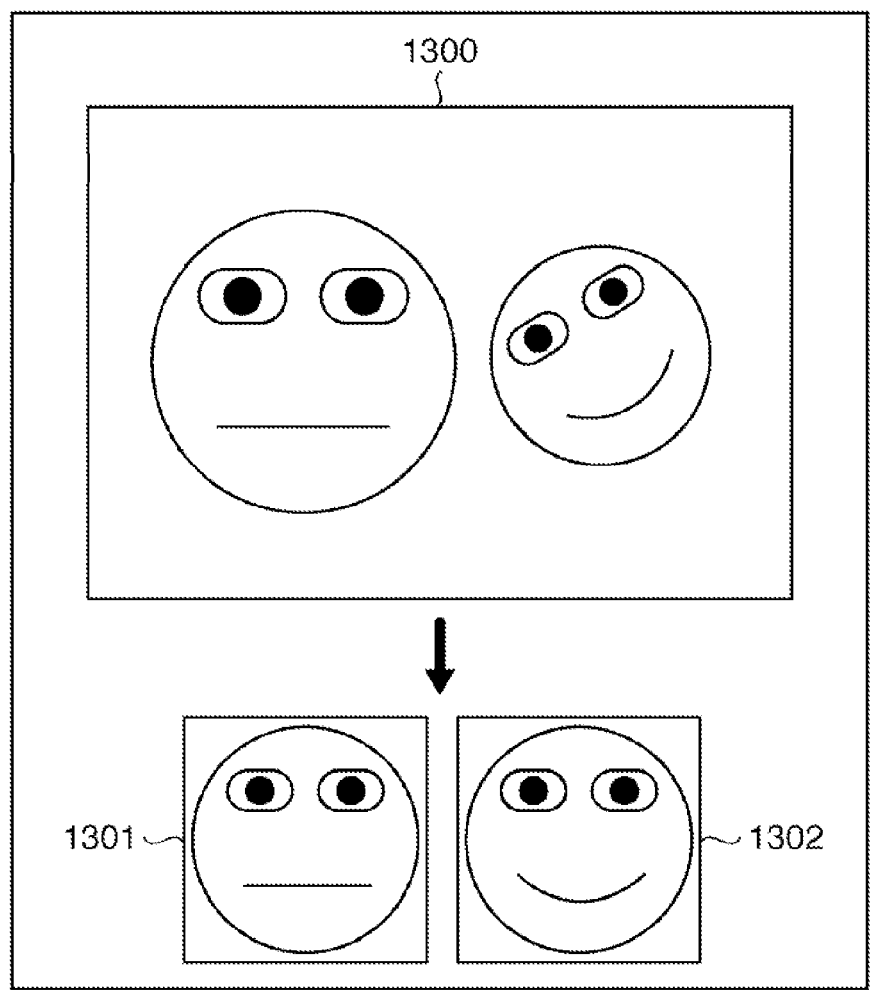
FIG. 5 is a view for explaining an outline of normalization.

The image normalization unit 1100 performs normalization for the image input by the image input unit 1000 on the basis of the barycentric positions of the face, eye, and mouth detected by the face detection unit 1001. More specifically, as shown in FIG. 5, the image normalization unit 1100 extracts a facial image from an input image 1300, and performs normalization such as rotation and enlargement/reduction for the image. In this normalization, as indicated by the normalized images 1301 and 1302, affine conversion is performed to make a straight line connecting the left and right eye positions become horizontal and to make the distance between the left and right eye positions be a predetermined distance (e.g., 40 pixels). Note that any technique can be used for interpolation in enlargement/reduction processing. For example, a bicubic method can be used.

The plural facial expression evaluation value calculation unit 1101 calculates the basic facial expression evaluation values of six basic facial expressions such as joy, anger, sadness, and pleasure and eye open/closed degree evaluation values. That is, the plural facial expression evaluation value calculation unit 1101 obtains basic facial expression evaluation values corresponding to a smiling face, a disgusted face, a sad face, an embarrassed face, a surprised face, and an angry face and eye open/closed degree evaluation values, and outputs them as facial expression evaluation values. When calculating a smiling facial expression evaluation value and an eye open/closed degree evaluation value, the plural facial expression evaluation value calculation unit 1101 calculates the eye open/closed evaluation value after calculating the smiling facial expression evaluation value. If possible, it suffices to concurrently calculate a smiling facial expression evaluation value and an eye open/closed degree evaluation value. Although the plural facial expression evaluation value calculation unit 1101 in this embodiment calculates evaluation values on the six basic facial expressions such as joy, anger, sadness, and pleasure and eye open/closed degree evaluation values, it obviously suffices to calculate other evaluation values.

Figure 6:
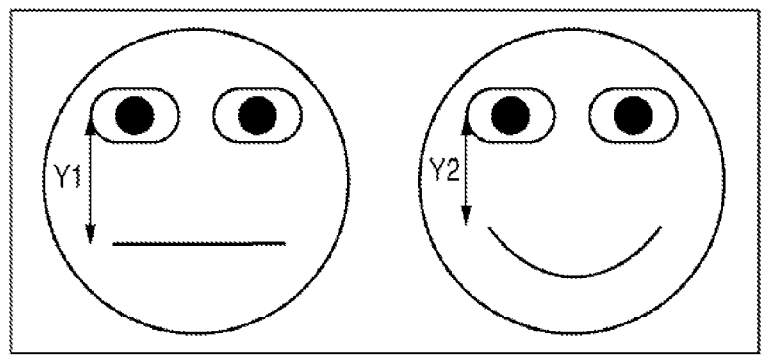
FIG. 6 is a view for explaining an outline of calculation for a facial expression evaluation value.

Calculation of evaluation values on six basic facial expressions such as joy, anger, sadness, and pleasure can be implemented by a known technique. For example, the technique disclosed in Japanese Patent Laid-Open No. 2005-056388 can be used. According to this technique, change amounts for a feature amount of each portion is calculated from the difference between a feature amount (e.g., a distance Y1 between a corner of an eye and a corner of the mouth in the Y direction in FIG. 6) of predetermined portion group obtained from an expressionless image prepared in advance and a feature amount (e.g., a distance Y2 between a corner of an eye and a corner of the mouth in the Y direction in FIG. 6) of predetermined portion group obtained from an input image. The evaluation value (score) on each facial expression is calculated from the change amounts for the predetermined portion group.

Note that this embodiment uses an average image of the expressionless images of a plurality of persons as the expressionless image prepared in advance.

Figure 7:
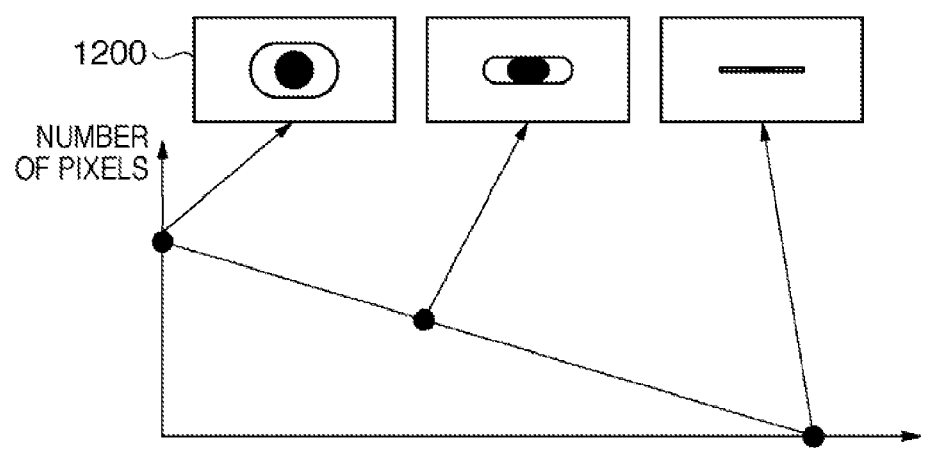
FIG. 7 is a first view for explaining an outline of calculation for an eye open/closed degree evaluation value.
Figure 8:
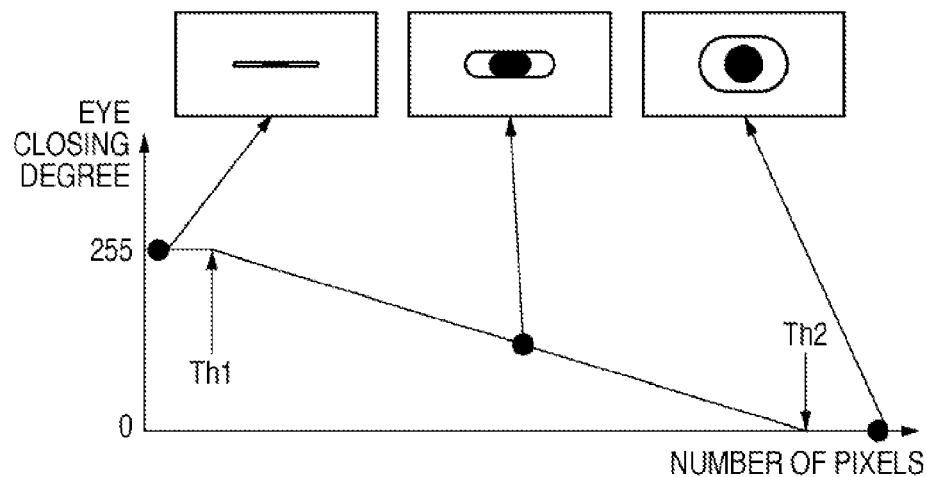
FIG. 8 is a second view for explaining an outline of calculation for an eye open/closed degree evaluation value.

A method of calculating an eye open/closed degree evaluation value will be simply described below. When an eye open/closed degree evaluation value is to be calculated, first of all, as shown in FIG. 7, the face detection unit 1001 sets a rectangular area 1200 centered at the barycentric position of each of the left and right eyes detected by the face detection unit 1001. Assume that the rectangular area is a predetermined range (10 pixels in the vertical direction and 10 pixels in the horizontal direction) centered at the barycentric position of each of the left and right eyes. A binary image is generated by performing threshold processing for the rectangular area 1200. If, for example, the rectangular area 1200 has 8-bit tone levels (tone levels 0 to 255), the threshold is set to 100. Pixels, of the pixels constituting the rectangular area 1200, which have luminance values more than or equal to 100 are each set to a luminance value of 255. In contrast, pixels having luminance values smaller than 100 are set to a pixel value of 0. Thereafter, the number of pixels each having a luminance value of 0 in the rectangular area 1200 is counted. FIG. 7 is a graph showing the number of pixels with a luminance value of 0. While the eye is open, the number of pixels with a luminance value of 0 is large due to the presence of a pupil region. In contrast to this, while the eye is closed, since the pupil region is hidden, the number of pixels with a luminance value of 0 decreases. An eye closing degree is calculated by using this phenomenon (see FIG. 8). The eye closing degrees shown in FIG. 8 are calculated by using a function (e.g., 8 bits (tone levels 0 to 255)) for converting the number of pixels with a luminance value of 0 into an eye closing degree. In this case, the nearer to 255 an eye closing degree is, the more the eye is closed, and vice versa. Note that the above threshold can be set to an arbitrary value corresponding to an image or the like.

A pixel count Th1 corresponding to an eye closing degree of 255 is determined by calculating the average value of the numbers of pixels with a luminance value of 0 from many eye closed images. A pixel count Th2 corresponding to an eye closing degree of 0 is determined by calculating the average value of the numbers of pixels with a luminance value of 0 from many eye open images. Note that it suffices to determine the pixel count Th1 corresponding to an eye closing degree of 255 and the pixel count Th2 corresponding to an eye closing degree of 0 by using a method other than that described above.

Referring back to FIG. 3, the priority processing unit 1003 determines a priority to be given to each facial expression on the basis of the facial expression evaluation value calculated by the calculation unit 1002. More specifically, the priority processing unit 1003 assigns a weight to each facial expression evaluation value calculated by the calculation unit 1002, on the basis of a priority information table 1010 shown in FIG. 9. According to an example of the priority information table 1010 shown in FIG. 9, smiling faces and eye closed faces are classified into category 1, sad faces and embarrassing faces are classified into category 2, and surprised faces are classified into category 3. That is, in the priority information table 1010, the respective facial expressions are classified into predetermined categories (facial expression categories), and the priority processing unit 1003 determines priorities in relationship with the facial expressions classified into the facial expression categories. According to the priority information table 1010 shown in FIG. 9, if a facial expression evaluation value E1 indicating a smiling facial expression degree is larger than a predetermined value Er1, the priorities of a smiling facial expression and eye closed facial expression are determined to 1 and 0.5, respectively. That is, if the smiling facial expression evaluation value E1 is larger than the predetermined value Er1, the weight given to the smiling facial expression becomes larger than that given to the eye closed facial expression. If the facial expression evaluation value E1 indicating a smiling facial expression degree is smaller than the predetermined value E1, both the priorities given to the smiling facial expression and eye closed facial expression are determined to 1. A manner of determining priorities (weights) defined in the priority information table shown in FIG. 9 will be described below.

Figure 10:
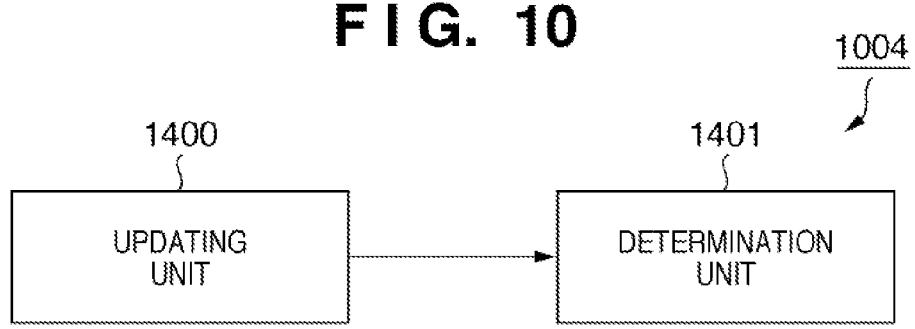
FIG. 10 is a block diagram showing an example of the arrangement of a recognition unit 1004 shown in FIG. 3.

The recognition unit 1004 determines the facial expression detected by the face detection unit 1001 and recognizes the facial expression of the person which is input by the image input unit 1000. In this case, the recognition unit 1004 includes an updating unit 1400 and a determination unit 1401, as shown in FIG. 10.

The updating unit 1400 updates (changes) the relationship between the facial expression evaluation value calculated by the calculation unit 1002, on the basis of the priority given to the facial expression, which is determined by the priority processing unit 1003, and a threshold for determining a facial expression which corresponds to the evaluation value. This updating operation is performed by multiplying a facial expression evaluation value $E_i$ calculated by the calculation unit 1002 by a facial expression priority $w_i$, where i is a facial expression number, that is, a value indicating each facial expression as indicated by equation (1). For example, a smiling facial expression is assigned with facial expression number 1, and an eye closed facial expression is assigned with facial expression number 2. $E_i'$ represents the facial expression evaluation value corresponding to a facial expression number i after updating.

$$E_i' = E_i \times w_i (i \geq 1) \quad (1)$$

Figure 11:
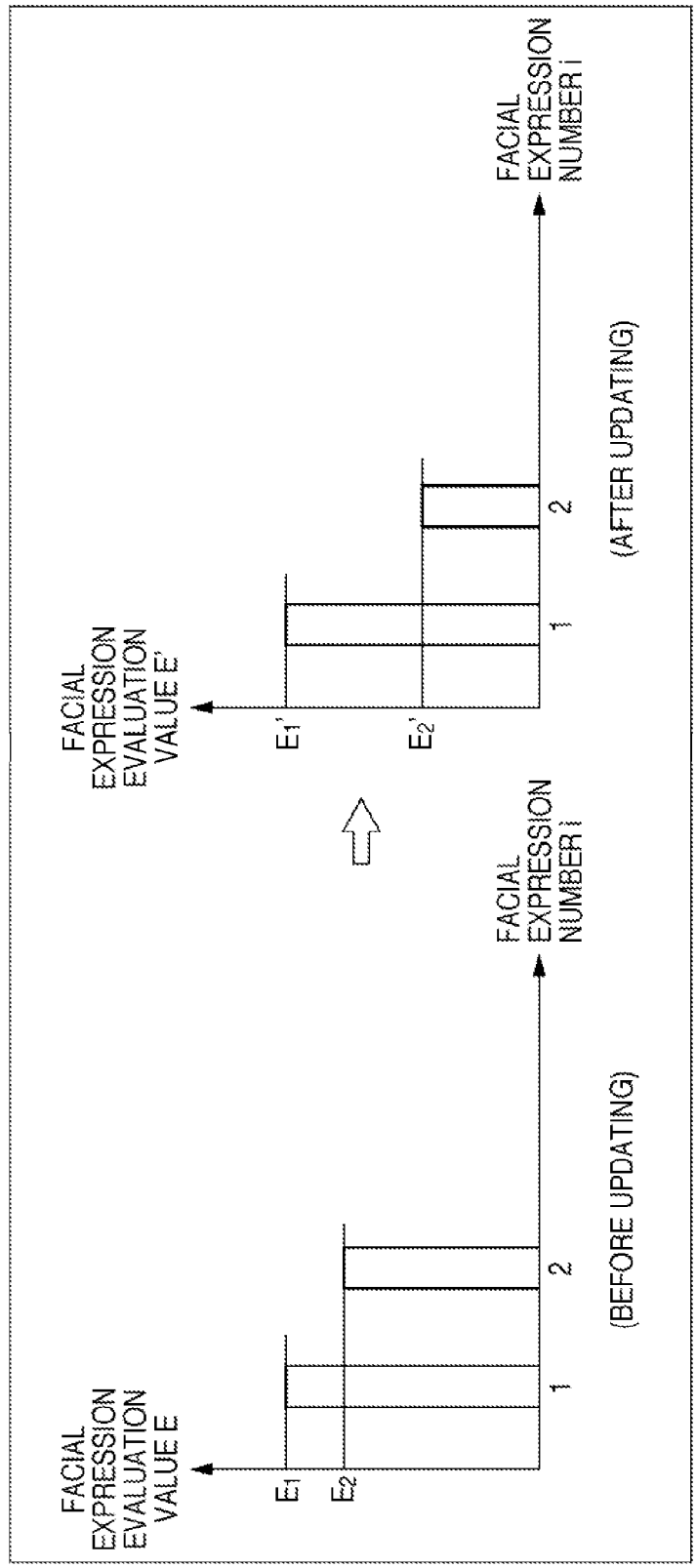
FIG. 11 is a first view for explaining an outline of update for a facial expression evaluation value.

FIG. 11 is a graph showing the facial expression evaluation value $E_i$ before updating and the facial expression evaluation value $E_i'$ after updating for the image shown in FIG. 1A. A facial expression evaluation value $E_2$ corresponding to facial expression number 2 before updating is relatively high, but a facial expression evaluation value $E_2'$ after updating is low.

The determination unit 1401 determines a facial expression based on the updating result obtained by the updating unit 1400. Facial expression determination is performed by executing predetermined threshold processing for the facial expression evaluation value $E_i'$ updated by the updating unit 1400. More specifically, if the facial expression evaluation value $E_i'$ exceeds a threshold $Th_i$ for determining a facial expression, the determination unit 1401 determines that the face of the person detected by the face detection unit 1001 has a facial expression indicated by the facial expression number i.

Figure 12:
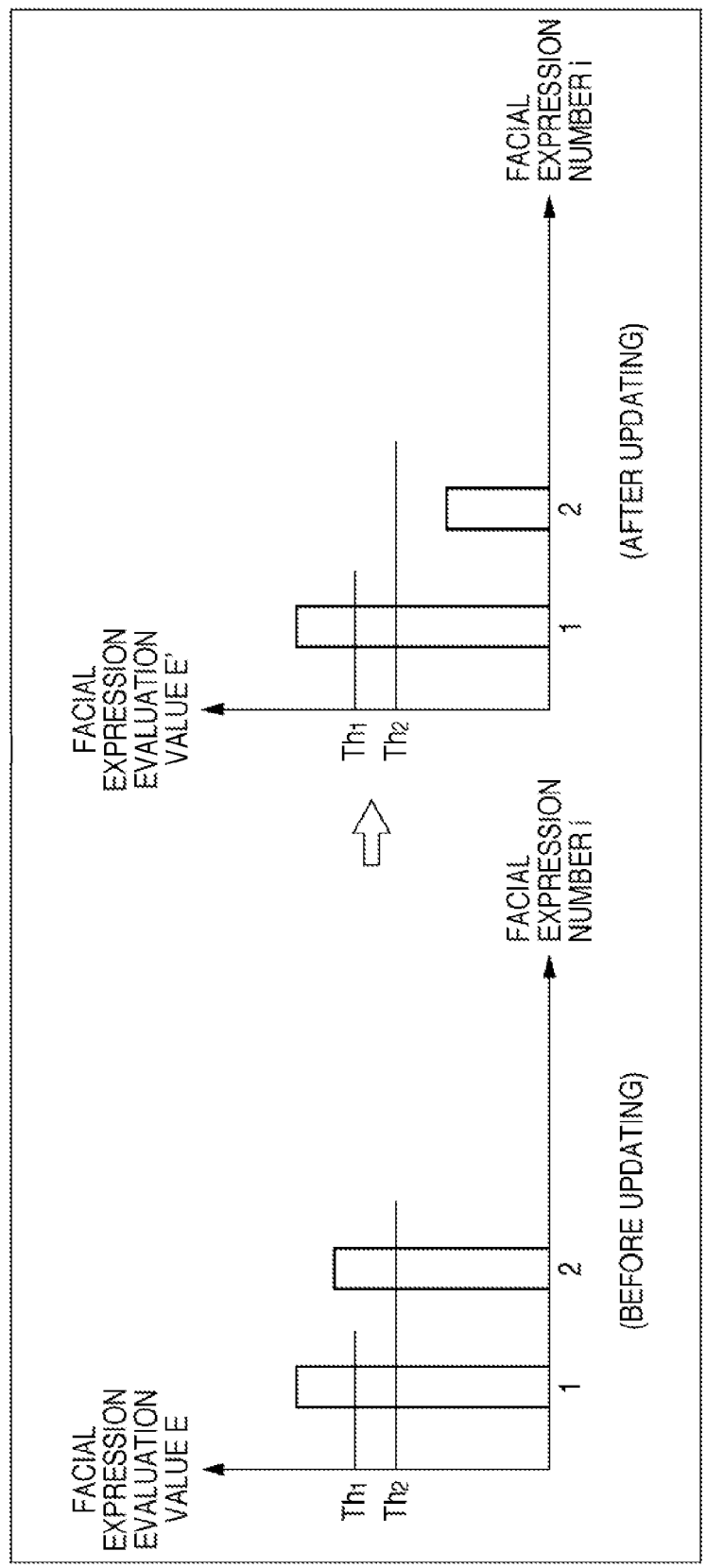
FIG. 12 is a second view for explaining an outline of update for a facial expression evaluation value.

FIG. 12 is a view showing the facial expression evaluation value $E_i$ before updating, the facial expression evaluation value $E_i'$ after updating, and the threshold $Th_i$ for determining a facial expression which corresponds to each facial expression number for the image shown in FIG. 1A. As shown in FIG. 12, the facial expression evaluation values corresponding to facial expression numbers 1 and 2 before updating, that is, a facial expression evaluation value $E_1$ on the smiling facial expression and a facial expression evaluation value $E_2$ on an eye closed facial expression, exceed thresholds $Th_1$ and $Th_2$ for determining a facial expression, respectively. Therefore, it is determined from the facial expression evaluation values $E_1$ and $E_2$ before updating that the person is smiling with his/her eyes closed. After updating, the facial expression evaluation value $E_1'$ on the smiling facial expression exceeds the threshold $Th_1$ for determining a facial expression, but the evaluation value $E_2'$ on the eye closed facial expression does not exceed the threshold $Th_2$ for determining a facial expression. Therefore, a smiling facial expression is determined. That is, if the smiling facial expression evaluation value $E_1$ is more than or equal to a predetermined value, a smiling facial expression is determined unless the eye closed facial expression evaluation value $E_2$ is very high, thereby giving a higher priority to the smiling facial expression.

Figure 13:
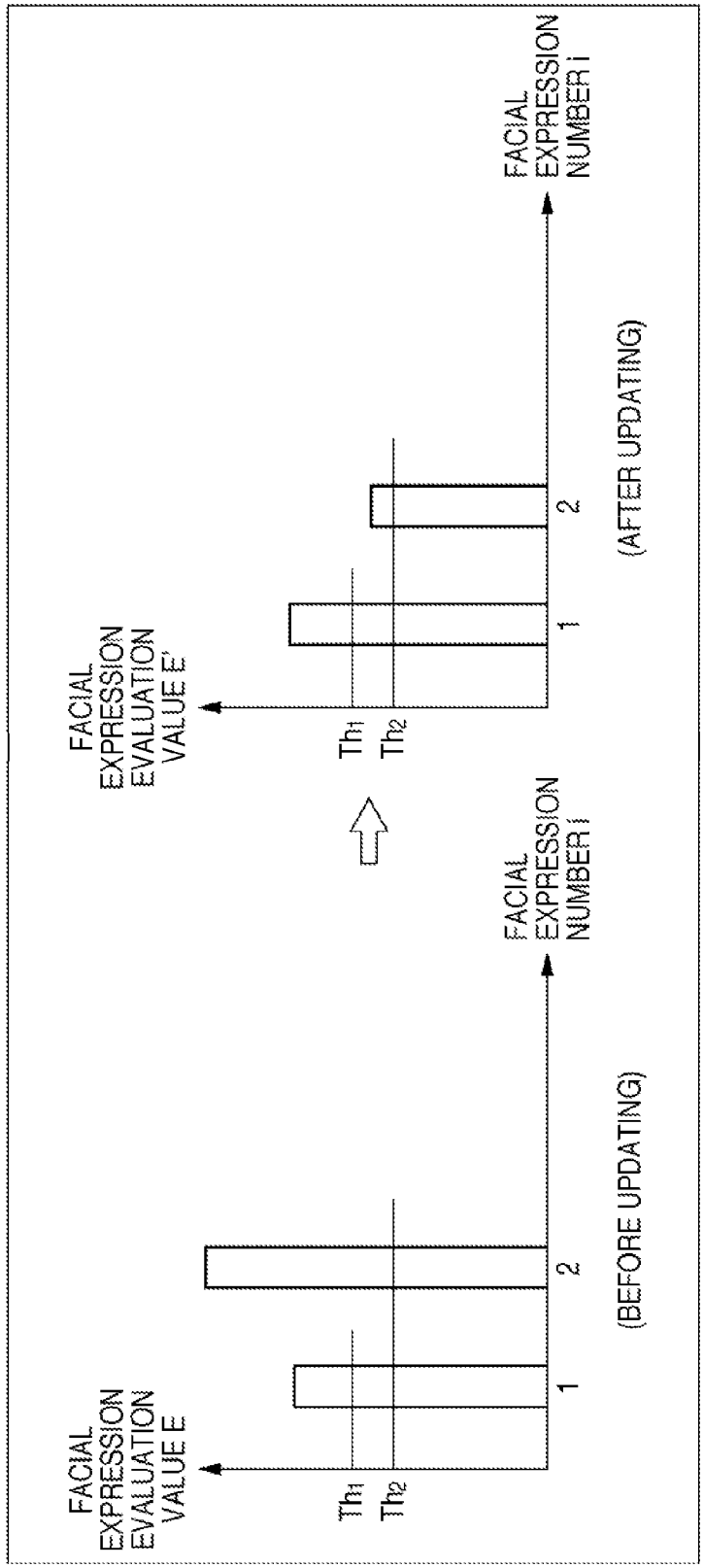
FIG. 13 is a third view for explaining an outline of update for a facial expression evaluation value.

FIG. 13 is a view showing the facial expression evaluation value $E_i$ before updating, the facial expression evaluation value $E_i'$ after updating, and the threshold $Th_i$ for determining a facial expression which corresponds to each facial expression number for the image shown in FIG. 1B. As shown in FIG. 13, since the facial expression evaluation values corresponding facial expression numbers 1 and 2 before updating, that is, the facial expression evaluation value $E_1$ on the smiling facial expression and the facial expression evaluation value $E_2$ on the eye closed facial expression, exceed the thresholds $Th_1$ and $Th_2$ for determining a facial expression, respectively, it is determined that the person is smiling with his/her eyes closed. In addition, since the facial expression evaluation value $E_1$ on the smiling facial expression and the facial expression evaluation value $E_2$ on the eye closed facial expression after updating exceed the thresholds $Th_1$ and $Th_2$ for determining a facial expression, respectively, it is determined that the person is smiling with his/her eyes closed. Likewise, when the person completely closes his/her eyes, an eye closed facial expression is determined.

As described above, in this embodiment, since a priority given to each facial expression is determined based on each calculated facial expression evaluation value $E_i$ and each facial expression evaluation value $E_i$ is updated, for example, an eye closed facial expression is determined only when the facial expression evaluation value $E_2$ on the eye closed facial expression is very high.

Figure 9:
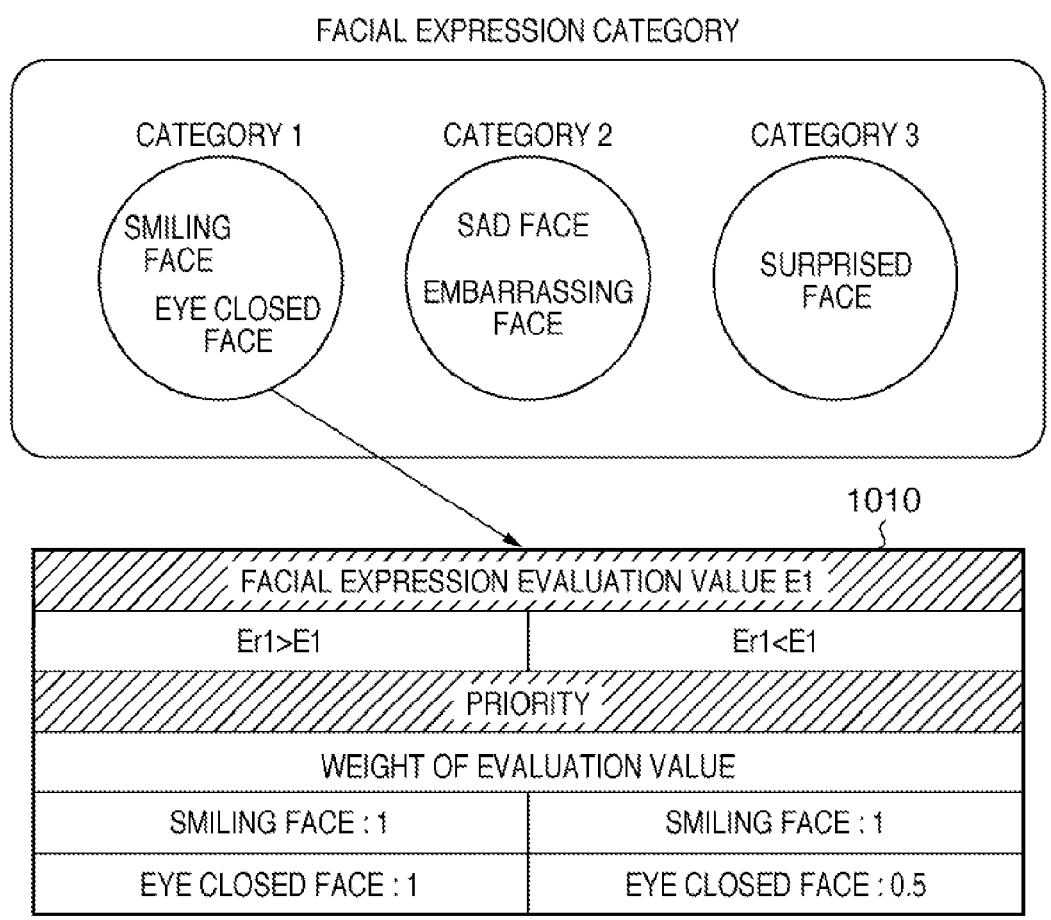
FIG. 9 is a view showing an outline of a priority information table.
Figure 14:
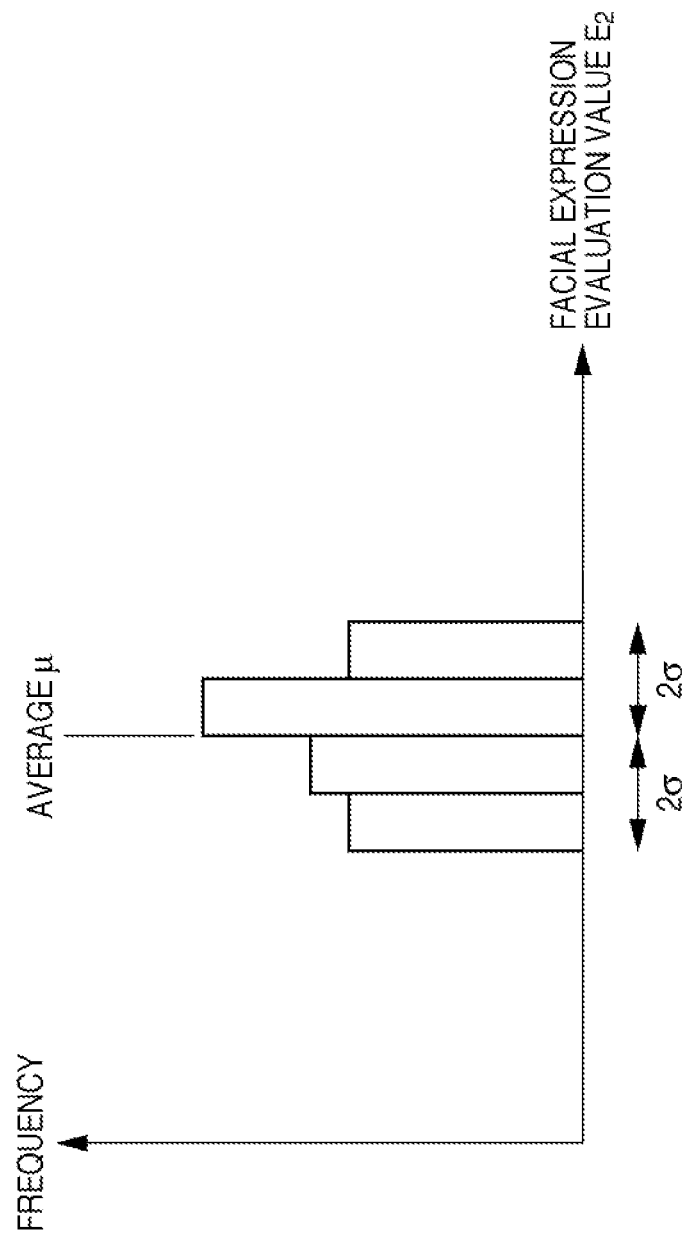
FIG. 14 is a graph for explaining an outline of a method of defining priorities.

The priorities defined in the priority information table shown in FIG. 9 will be described below with reference to FIG. 14.

The priority information table is provided with priorities corresponding to facial expression evaluation values, as described above. When priorities are defined in the table, the histogram of facial expression evaluation values $E_k$ is generated by using an image group having a predetermined facial expression, and a maximum facial expression evaluation value $E_{kMax}$ existing in a predetermined range is calculated from an average μ of the histogram. A priority $w_k$ is determined such that calculated maximum facial expression evaluation value $E_{kMax} \times$ priority $w_k$ does not exceed a threshold $Th_k$ for determining a facial expression. The histogram of eye closed facial expression evaluation values $E_2$ is generated by using an image group with his/her eyes closed halfway as shown in FIG. 1A, and a maximum facial expression evaluation value $E_{2Max}$ within a predetermined range of ±2σ is calculated from the average μ. A priority $w_2$ is determined such that the maximum facial expression evaluation value $E_{2Max}$ does not exceed the threshold $Th_2$ for determining a facial expression.

Figure 15:
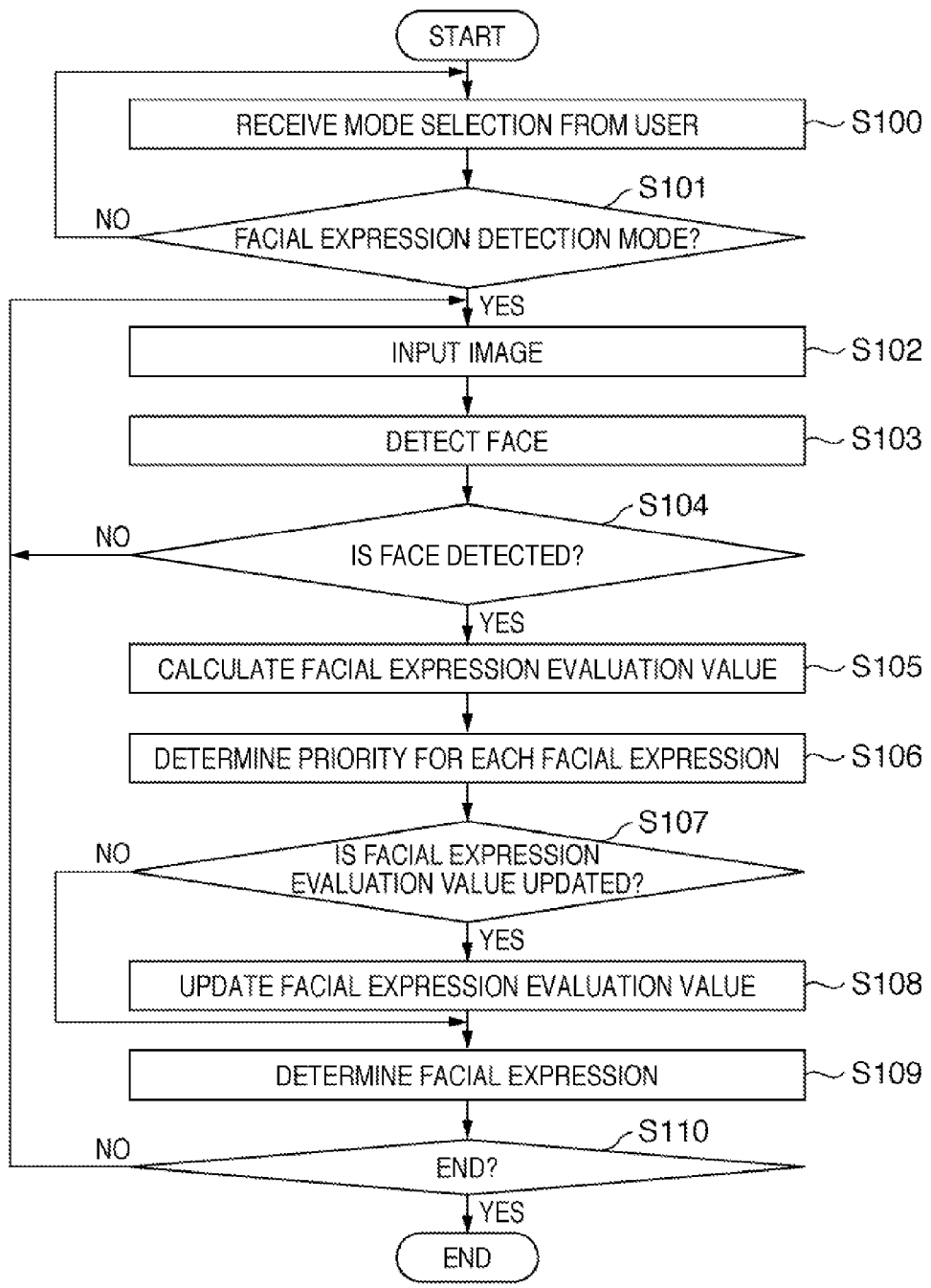
FIG. 15 is a flowchart showing a sequence of facial expression determination in the facial expression recognition apparatus 10 shown in FIG. 3.

A sequence of facial expression determination in the facial expression recognition apparatus 10 shown in FIG. 3 will be described next with reference to FIG. 15.

In S100, the user selects a mode by using a user interface. For example, the user selects the facial expression detection mode. In S101, it is checked whether the user has selected the facial expression detection mode. If the user has not selected the mode, the process returns to S100. If the user has selected the facial expression detection mode, the process advances to S102.

In S102, the image input unit 1000 inputs an image. In S103, the face detection unit 1001 performs face detection from the image input in S102 by using the predetermined face detection algorithm described above.

If it is determined in S104 that the face of a person is not detected in S103, the process advances to S102 to input the next image. If the face of a person is detected, the process advances to S105.

In S105, the image normalization unit 1100 normalizes an image of the face of the person detected in S103, and the plural facial expression evaluation value calculation unit 1101 calculates the facial expression evaluation value $E_i$ for each facial expression from the image. In S106, the priority processing unit 1003 determines the priority $w_i$ for each facial expression based on the facial expression evaluation value $E_i$ calculated in S105.

In S107, the updating unit 1400 updates the facial expression evaluation value $E_i$ based on the priority $w_i$ for each facial expression determined in S106. If, for example, the priorities $w_1$ and $w_2$ for facial expressions are different from initial values (e.g., $w_1$=1.0 and $w_2$=1.0), the process advances to S108 to update the facial expression evaluation value $E_i$ calculated in S105 based on the priority $w_i$ for the facial expression determined in S106. Otherwise, the facial expression evaluation value $E_i$ is not updated.

In S109, the determination unit 1401 performs facial expression determination by using the facial expression evaluation value $E_i$' updated in S108 and the threshold $Th_i$ for determining a facial expression for each of the facial expressions described above.

If it is determined in S110 that the facial expression determination is terminated, the processing is terminated. Otherwise, the process advances to S102 to input the next image.

As described above, according to the first embodiment, a priority for each facial expression is determined based on a calculated facial expression evaluation value, and facial expression determination is performed by updating the facial expression evaluation value, on the basis of the priority. This makes it possible to perform facial expression determination with high accuracy. Even if facial parts such as eyes and mouths have similar shapes, it is possible to accurately recognize facial expressions. If, therefore, a digital camera or the like is equipped with facial expression recognition, optimal image capturing can be implemented.

Second Embodiment

The second embodiment will be described next. Note that the arrangement of a facial expression recognition apparatus 10 in the second embodiment has the same arrangement as that in the first embodiment in FIG. 3, and hence a description will not be repeated.

Figure 16:
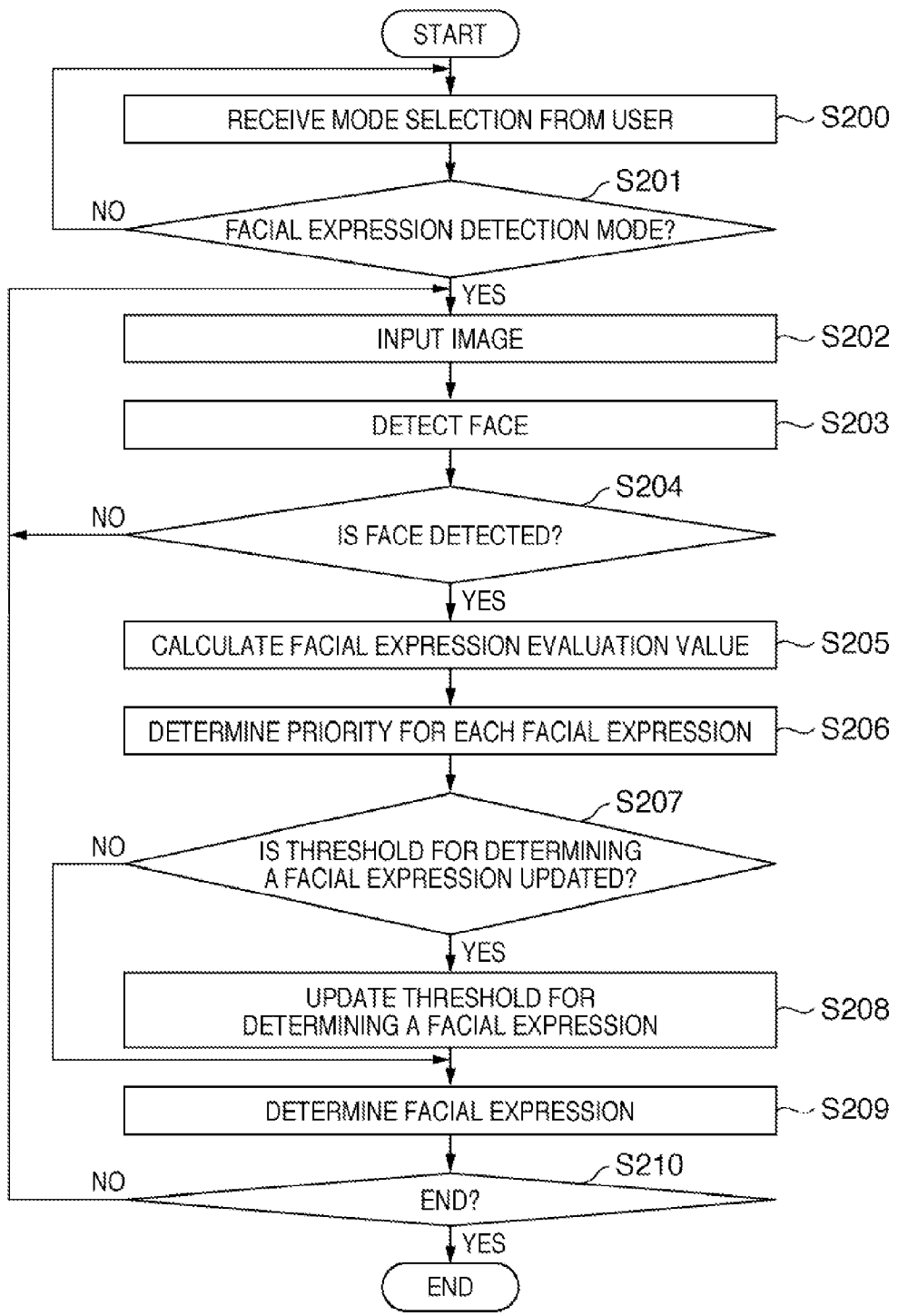
FIG. 16 is a flowchart showing a sequence of facial expression determination in a facial expression recognition apparatus 10 according to the second embodiment.

A sequence of facial expression determination in the facial expression recognition apparatus 10 according to the second embodiment will be described with reference to FIG. 16. Only processing different from that in the first embodiment in FIG. 15 will be described below. The difference resides in the processing in S S207 and S208.

Figure 17:
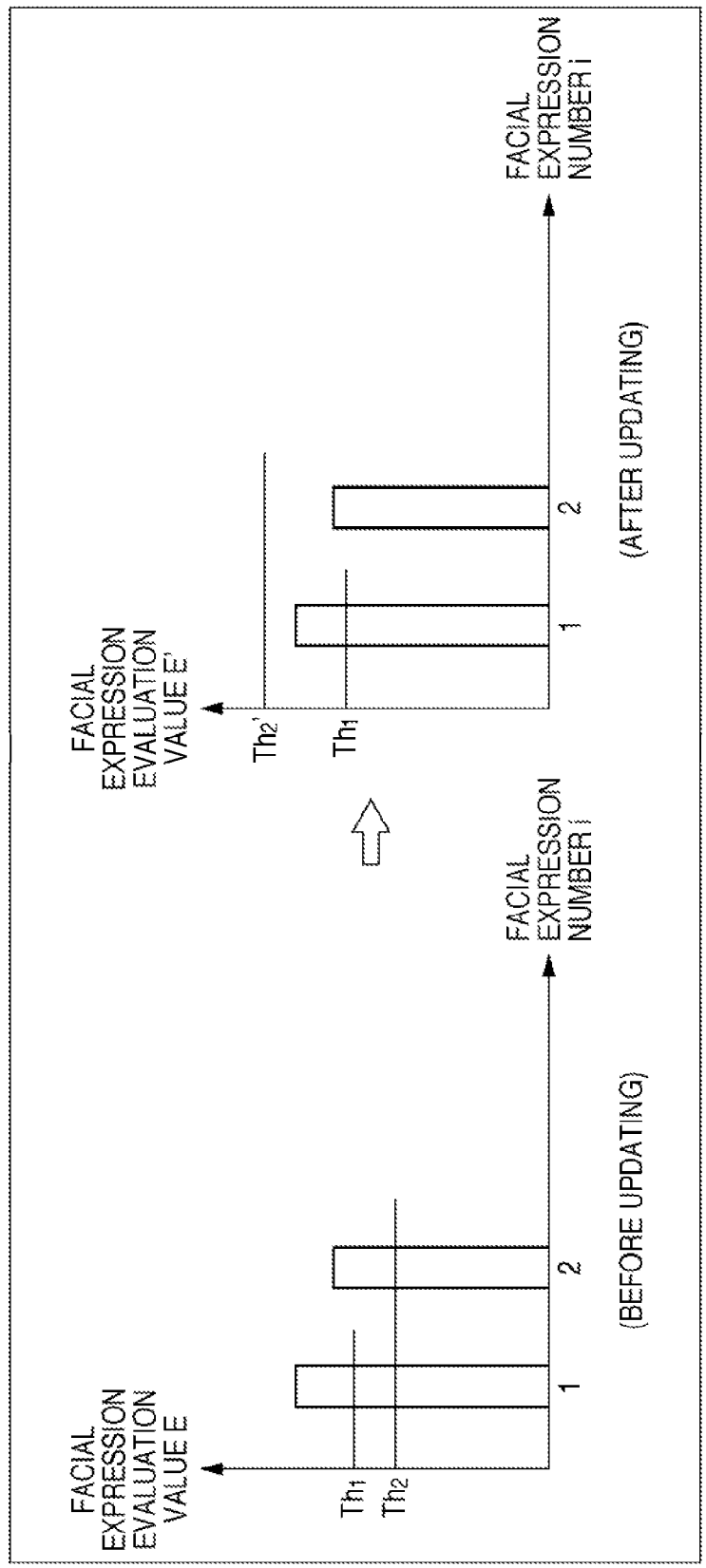
FIG. 17 is a view for explaining an outline of update for a facial expression evaluation value according to the second embodiment.

In S207, a threshold for determining a facial expression is updated instead of a facial expression evaluation value unlike in the first embodiment. That is, each threshold for determining a facial expression is updated as shown in FIG. 17 instead of each facial expression evaluation value which is updated by multiplying the facial expression evaluation value by a weight as shown in FIG. 12. That is, the relationship between a facial expression evaluation value and a threshold for determining a facial expression which corresponds to the evaluation value is updated by changing the threshold for determining a facial expression.

This threshold for determining a facial expression is determined as follows. As shown in FIG. 14, for example, the histogram of eye closed facial expression evaluation values $E_2$ is generated by using an image group with his/her eyes closed halfway as shown in FIG. 1A, and a maximum facial expression evaluation value $E_{2Max}$ falling within a predetermined range of ±2σ from an average μ. A value larger than the maximum facial expression evaluation value $E_{2Max}$ is determined as a threshold $Th_2$' for determining a facial expression.

If it is determined in S207 that the threshold for determining a facial expression is updated, that is, the smiling facial expression evaluation value $E_1$ is more than or equal to the threshold $Th_1$ for determining a facial expression, the process advances to S208 to change the threshold $Th_2$ for determining a facial expression which corresponds to facial expression number 2 to $Th_2$'. Otherwise, the process advances to S209.

As described above, according to the second embodiment, a priority for each facial expression is determined based on a calculated facial expression evaluation value, and facial expression determination is performed by updating a threshold for determining a facial expression based on the priority. This makes it possible to accurately determine a facial expression. Even if facial parts such as eyes and mouths have similar shapes, it is possible to accurately recognize facial expressions. If, therefore, a digital camera or the like is equipped with facial expression recognition, optimal image capturing can be implemented.

Third Embodiment

The third embodiment will be described next. Note that the arrangement of a facial expression recognition apparatus 10 in the third embodiment has the same arrangement as that in the first embodiment in FIG. 3, and hence a description will not be repeated.

Figure 18:
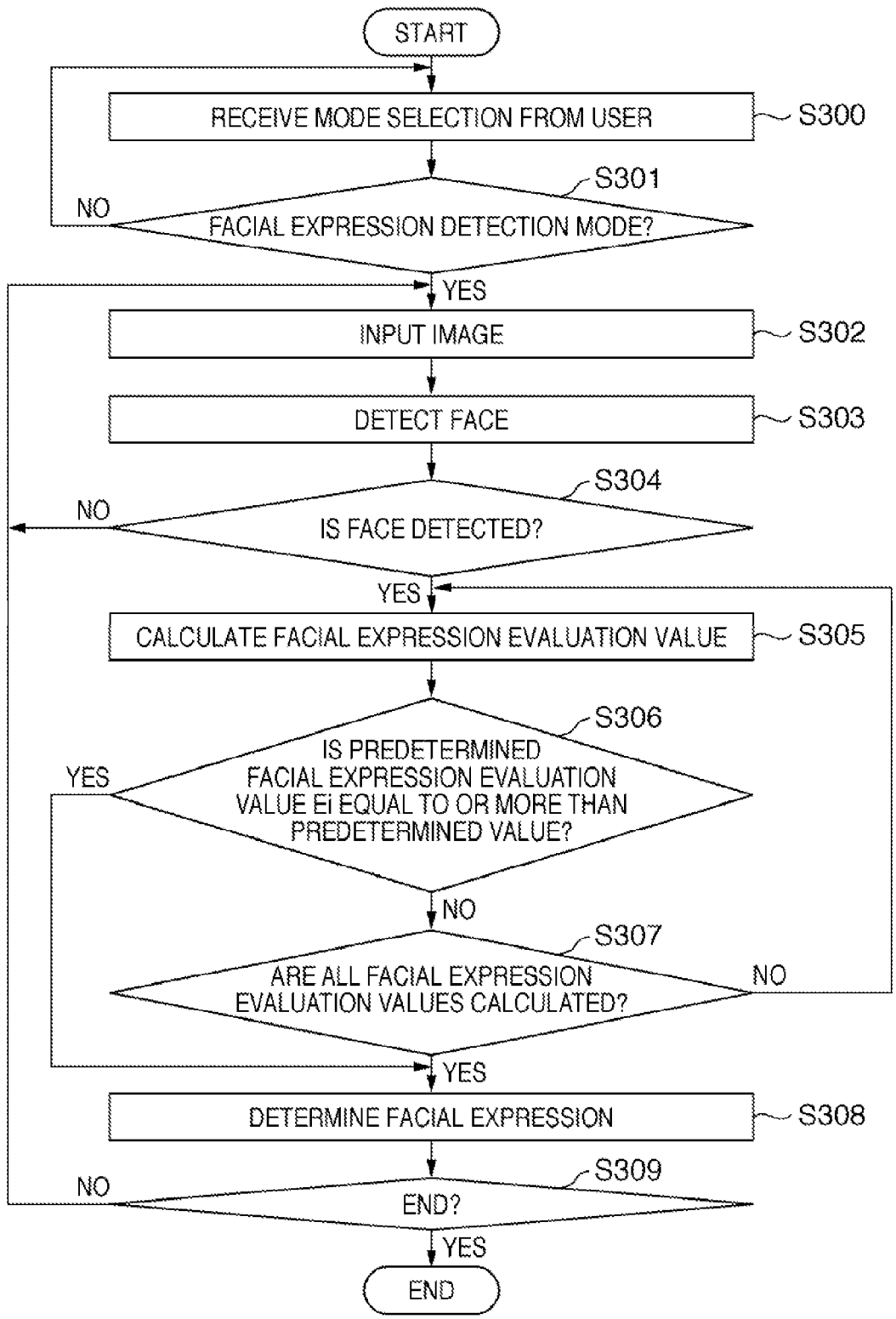
FIG. 18 is a flowchart showing a sequence of facial expression determination in a facial expression recognition apparatus 10 according to the third embodiment.

A sequence of facial expression determination in the facial expression recognition apparatus 10 according to the third embodiment will be described with reference to FIG. 18. Since the processing from S301 to S304 is the same as that from S101 to S104 in FIG. 15 in the first embodiment, a description will not be repeated. Processing in S305 and the subsequent S will be described.

In S305, an image normalization unit 1100 normalizes an image of the face of the person detected in S303, and a plural facial expression evaluation value calculation unit 1101 calculates a first facial expression evaluation value $E_i$ from the image. In this case, a calculation unit 1002 (actually the plural facial expression evaluation value calculation unit 1101) in the third embodiment cannot concurrently perform a plurality of facial expression evaluation calculation processes, and sequentially performs calculation for each facial expression.

In S306, it is determined whether the calculated facial expression evaluation value $E_i$ is more than or equal to a threshold $Th_i$ for determining a facial expression. For example, it is determined whether the eye closed facial expression evaluation value $E_i$ is more than or equal to the predetermined threshold $Th_i$ for determining a facial expression. If the facial expression evaluation value $E_i$ is more than or equal to the threshold $Th_i$ for determining a facial expression, the process advances to S308. If, for example, an eye closed facial expression evaluation value $E_7$ is more than or equal to a threshold $Th_7$ for determining a facial expression, this apparatus determines the facial expression as an eye closed facial expression without calculating other facial expression evaluation values. If the predetermined facial expression evaluation value $E_i$ is smaller than the predetermined threshold $Th_i$ for determining a facial expression, the process advances to S307.

If it is determined in S307 that all the facial expression evaluation value calculation processes are complete, the process advances to S308. If not all the facial expression evaluation value calculation processes are complete, the process advances to S305. In S308, if all the facial expression evaluation values are calculated, a priority is determined based on all the facial expression evaluation values. In contrast, if it is determined in S306 that the predetermined facial expression evaluation value $E_i$ is more than or equal to the predetermined threshold $Th_i$ for determining a facial expression, the facial expression exceeding the predetermined threshold $Th_i$ for determining a facial expression is determined as the facial expression of the face included in the image input in S302.

As described above, according to the third embodiment, if the predetermined facial expression evaluation value $E_i$ is more than or equal to the predetermined threshold $Th_i$ for determining a facial expression, the facial expression exceeding the predetermined threshold $Th_i$ for determining a facial expression is determined as the detected facial expression of the face, and other facial expression evaluation value calculation processes are not performed. This can save unnecessary processing and reduce the processing load.

Fourth Embodiment

The fourth embodiment will be described next. The fourth embodiment will exemplify a case in which priorities are determined based on results of authentication processes (individual authentication, age authentication, and sex authentication) and facial expressions are determined. Note that the fourth embodiment will exemplify a case in which the facial expression recognition apparatus 10 in the first embodiment described with reference FIG. 3 is applied to an image sensing apparatus 100.

Figure 19:
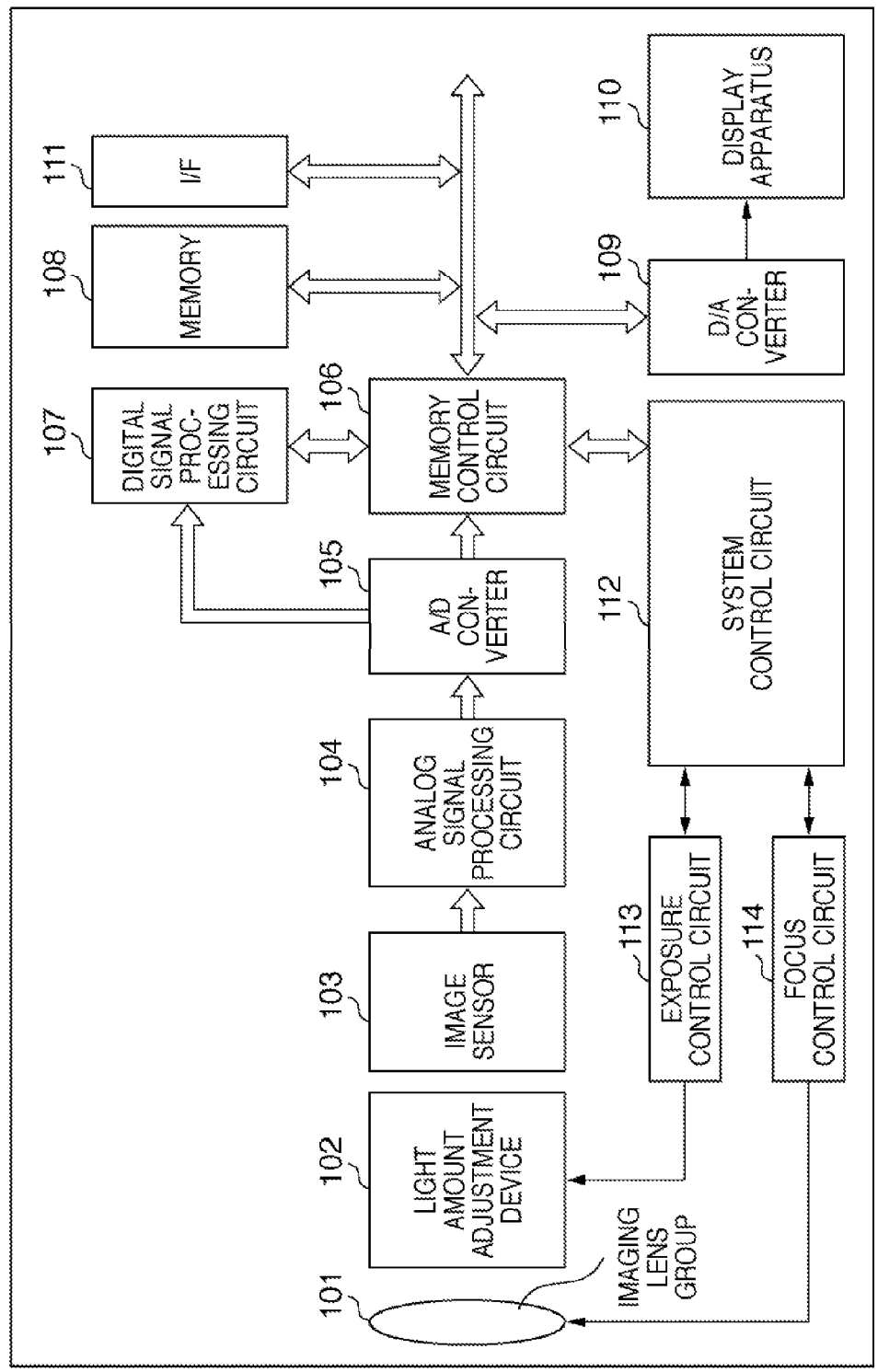
FIG. 19 is a block diagram showing an example of the arrangement of an image sensing apparatus 100.

FIG. 19 is a block diagram showing an example of the arrangement of the image sensing apparatus 100. The fourth embodiment uses an electronic still camera as an example of the image sensing apparatus 100.

Reference numeral 101 denotes an imaging lens group; 102, a light amount adjustment device including an aperture device and a shutter device; 103, an image sensor such as a CCD (Charge-Coupled Device) or CMOS (Complimentary Metal Oxide Semiconductor) sensor which converts a light beam as an object image which has passed through the imaging lens group into an electrical signal; 104, an analog signal processing circuit configured to perform clamp processing, gain processing, and the like for an analog signal output from the image sensor 103; and 105, an A/D converter configured to convert an output from the analog signal processing circuit 104 into a digital signal.

Reference numeral 107 denotes a digital signal processing circuit configured to perform predetermined pixel interpolating, color conversion, and the like for data from the A/D converter 105 or data from a memory control circuit 106. The digital signal processing circuit 107 performs predetermined arithmetic operation by using captured image data and performs TTL (Through The Lens)-based AWB (Auto-White Balance) processing, on the basis of the obtained arithmetic operation result. The digital signal processing circuit 107 further executes a face detection process, facial expression recognition process, individual authentication process, age authentication process, and sex authentication process for a specific object from the captured image data.

A system control circuit 112 performs, based on the above arithmetic operation results, TTL (Through The Lens)-based AF (AutoFocus) processing, AE (Auto Exposure) processing, and EF (Electronic Flash) processing by controlling an exposure control circuit 113 and a focus control circuit 114.

The memory control circuit 106 controls the analog signal processing circuit 104, the A/D converter 105, the digital signal processing circuit 107, a memory 108, and a digital/analog (to be referred to as D/A hereinafter) converter 109. With this operation, the data A/D-converted by the A/D converter 105 is written in the memory 108 via the digital signal processing circuit 107 and the memory control circuit 106 or via the memory control circuit 106.

The memory 108 stores data to be displayed on a display apparatus 110. The data recorded on the memory 108 is output and displayed on the display apparatus 110 such as a TFT LCD via the D/A converter 109. The memory 108 stores captured still images and moving images. Note that the memory 108 has a storage capacity large enough to store a predetermined number of still images or moving images corresponding to a predetermined time. This makes it possible to write a large quantity of images in the memory 108 at high speed in the continuous shooting mode of continuously capturing a plurality of still images or the panorama shooting mode. In addition, the memory 108 can be used as a work area for the system control circuit 112. Note that it suffices to write captured still images and moving images in a storage medium such as a CD-ROM, Floppy® disk, hard disk, magnetic tape, magnetooptic disk, or nonvolatile memory card by using an interface 111.

The display apparatus 110 can sequentially display captured image data. In this case, this apparatus functions as an electronic viewfinder. The display apparatus 110 can arbitrarily turn on/off display in accordance with an instruction from the system control circuit 112. Turning off display can greatly reduce the power consumption of the image sensing apparatus 100 as compared with a case in which display is turned on. The display apparatus 110 also displays an operation state, a message, or the like by using characters, images, and the like in accordance with the execution of a program by the system control circuit 112.

The interface (I/F) 111 is used for a storage medium such as a memory card or a hard disk. The image sensing apparatus 100 and another computer or a peripheral device such as a printer can transfer image data and management information attached to image data to each other by using the interface 111. If the interface 111 complies with standards for PCM-CIA cards, CF (Compact Flash®) cards, or the like, the interface 111 functions as a communication interface when various types of communication cards are connected. Various types of communication cards include a LAN card, a modem card, a USB card, an IEEE1394 card, a P1284 card, a SCSI card, a communication card such as a PHS card.

The system control circuit 112 controls the overall operation of the image sensing apparatus 100. A memory in the system control circuit 112 stores constants, variables, programs, and the like for the operation of the system control circuit 112 and for recognition of faces and facial expressions of specific objects. Note that it is possible to change these constants, variables, programs, and the like stored in the memory in the system control circuit 112 by using a CD-ROM, Floppy® disk, hard disk, magnetic tape, magnetooptic disk, or nonvolatile memory card. Data and programs for the operation of the system control circuit 112 and for detection of faces of specific objects may be read out from the above storage medium and executed instead of being stored in the memory. This operation is not limited to the method described above.

The exposure control circuit 113 controls the aperture device and shutter device of the light amount adjustment device 102. The focus control circuit 114 controls focusing and zooming of the imaging lens group 101. The exposure control circuit 113 and the focus control circuit 114 are controlled by using the TTL system. The system control circuit 112 controls the exposure control circuit 113 and the focus control circuit 114 on the basis of an arithmetic operation result on captured image data which is obtained by the digital signal processing circuit 107.

Figure 20A:
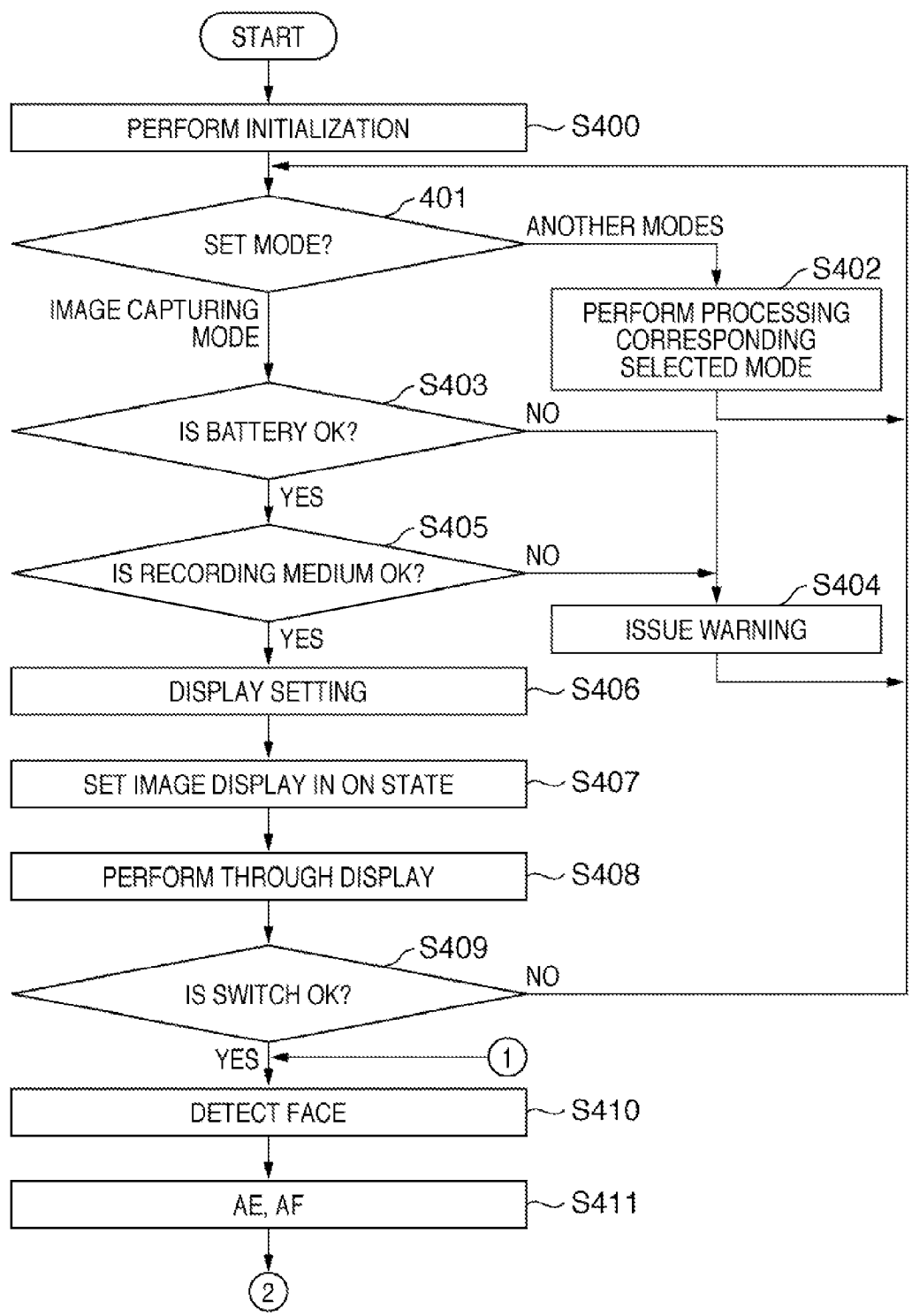
FIGS. 20A and 20B are flowcharts showing a processing sequence in the image sensing apparatus 100 shown in FIG. 19.
Figure 20B:
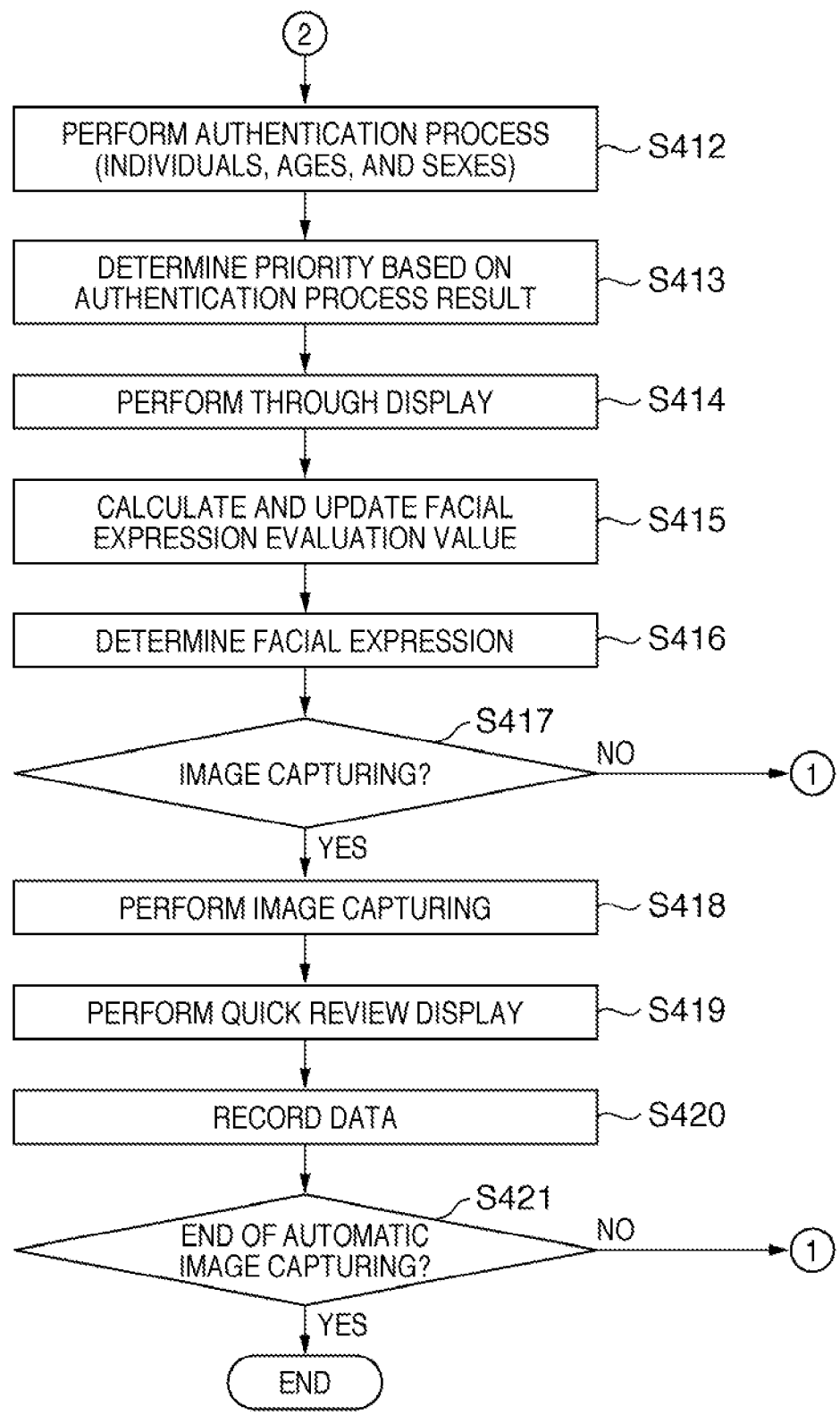

FIGS. 20A and 20B are flowcharts showing a processing sequence in the image sensing apparatus 100 according to the fourth embodiment. Note that a program which executes this processing is stored in, for example, the memory in the system control circuit 112, and is executed under the control of the system control circuit 112.

This processing is started when, for example, the power supply is turned on. First of all, in S400, the system control circuit 112 initializes various flags, control variables, and the like in the internal memory.

In S401, the system control circuit 112 detects the mode set state of the image sensing apparatus 100. Assume that the user selects the facial expression detection mode.

In S402, the system control circuit 112 executes processing in accordance with the selected mode. After completion of this processing, the process returns to S401. Upon determining in S401 that the image capturing mode is selected, the system control circuit 112 advances to S403 to determine whether there is any problem in the operation of the image sensing apparatus 100 in association with the remaining capacity of the power supply or the operation state. Upon determining that there is a problem, the system control circuit 112 advances to S404 to perform predetermined warning display by an image or sound using the display apparatus 110.

Thereafter, the process returns to S401. Upon determining that there is no problem in the power supply, the system control circuit 112 advances to S405.

In S405, the system control circuit 112 determines whether there is any problem in the operation of the image sensing apparatus 100 in association with the operation state of the storage medium, in particular, recording/playback operation of image data on/from the storage medium. Upon determining that there is a problem, the system control circuit 112 advances to S404 described above to perform predetermined warning display by an image or sound using the display apparatus 110. The process then returns to S401. Upon determining that there is no problem in the storage medium, the system control circuit 112 advances to S406.

In S406, the system control circuit 112 displays a user interface (to be referred to as a UI hereinafter) for various set states of the image sensing apparatus 100 by images and sounds using the display apparatus 110. If the image display of the display apparatus 110 is ON, it suffices to display a UI for various set states of the image sensing apparatus 100 by images or sounds using the display apparatus 110. In this manner, the user makes various kinds of settings.

In S407, the system control circuit 112 sets the image display of the display apparatus 110 in the ON state. In S408, the system control circuit 112 sets a through display state in which captured image data are sequentially displayed. In the through display state, an electronic viewfinder function is implemented by sequentially displaying the data written in the memory 108 on the display apparatus 110.

In S409, it is determined whether a user, for example, a person who captures images has pushed the shutter switch. If the user has not pushed the shutter switch, the process returns to S401. If the user has pushed the shutter switch, the process advances to S410.

In S410, the system control circuit 112 executes a face detection algorithm like that described in the first embodiment. In S411, if the face of a person is detected in S410, predetermined AE/AF control is performed for the face of the person.

In S412, an authentication process is performed for the face of the person detected in S410. In an authentication process, either or all of individual authentication, age authentication, and sex authentication are performed. Although there are various techniques for individual authentication, it suffices to use, for example, the technique disclosed in K. Mori, M. Matsugu, and T. Suzuki, "Face Recognition Using SVM Fed with Intermediate Output of CNN for Face Detection", Machine Vision Application, pp. 410-413, 2005. More specifically, as described in the first embodiment, individual authentication is performed by generating a feature vector from low-order (edges) features based on CNN used for face detection and comparing the feature vector with a reference feature vector prepared in advance by using the support vector machine described in Koji Tsuda, "Overview of Support Vector Machine", The Journal of the Institute of Electronics, Information, and Communication Engineers, Vol. 83, No. 6, pp. 460-466, 2000.

In age authentication, average faces of the respective age groups are prepared in advance. Matching is performed between the average face of each age group with the face of the person detected in S410. The age group exhibiting the highest similarity is determined (estimated) as the one to which the face of the person detected in S410 belongs. Note that it suffices to generate average faces of the respective age groups based on a large quantity of acquired normalized images of the respective age groups (e.g., 0 to 10 years, 10 to 20 years, and 20 to 30 years).

In sex authentication, sex-specific average faces are prepared in advance, and matching is performed between the sex-specific average faces and the face of the person detected in S410. The sex exhibiting the highest similarity is determined (estimated) as the sex corresponding to the face of the person detected in S410. Note that it suffices to generate sex-specific average faces based on a large quantity of acquired normalized images of males and females.

In S413, a priority is determined for each facial expression in the facial expression category on the basis of the authentication result in S412. Note that in this embodiment, individual authentication has been performed as an authentication process. If, for example, the face detected by the individual authentication result in S412 is determined as a person A, a priority is determined for each facial expression in the facial expression category by referring to a history table 2000 as shown in FIG. 21. Note that the history table 2000 is stored in, for example, the memory in the system control circuit 112, and is updated every time a specific facial expression of each person is detected. Referring to the history table 2000 shown in FIG. 21, with regard to the person A, a crying facial expression is detected 30 times in the past while no embarrassed facial expression is detected. Since the frequency of occurrence of a crying facial expression is higher than that of an embarrassed facial expression, a priority of 1.3 is given to a crying facial expression, and a priority of 0.8 is given to an embarrassed facial expression. Such priorities are determined by using the history table 2000 and a priority information table (person table). For example, since the crying facial expression of the person A is detected 30 times while no embarrassed facial expression is detected, the ratio between the number of times of a crying facial expression and that of an embarrassed facial expression is 30:0. Therefore, a priority of 1.3 is given to a crying facial expression, and a priority of 0.8 is given to an embarrassed facial expression.

Figure 22:
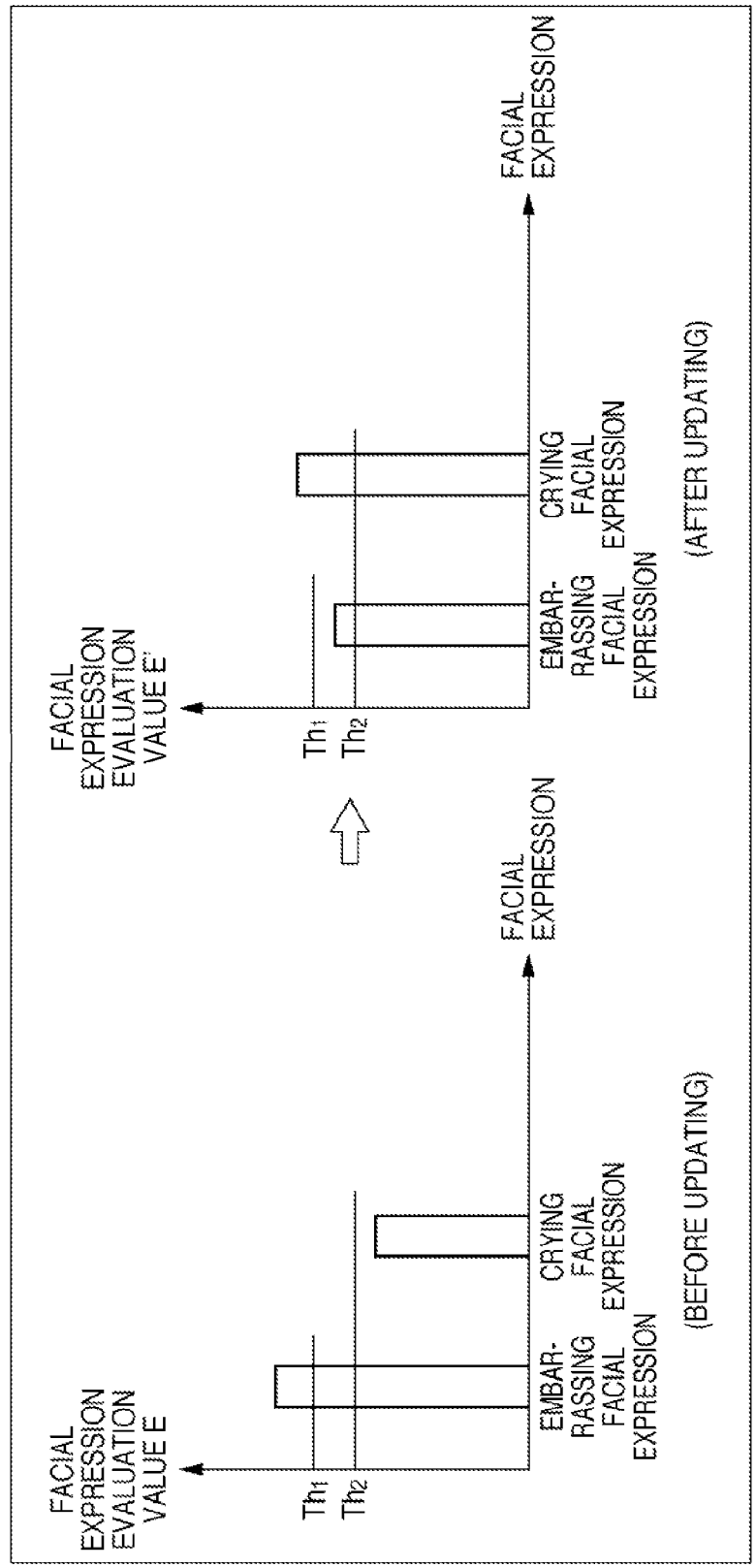
FIG. 22 is a view for explaining an outline of update for a facial expression evaluation value according to the fourth embodiment.

When a priority is given to each facial expression in the facial expression category by using the facial expression detecting history in this manner, for example, as shown in FIG. 22, the facial expression of the person A is determined as an embarrassed facial expression before updating, but is determined as a crying facial expression after updating. If, for example, the person A is an infant, since the past detection frequency of a crying facial expression is higher, a crying facial expression is determined with higher possibility than an embarrassed facial expression.

Note that when age authentication or sex authentication is to be performed as an authentication process, each priority is determined by using an age group table 2001 and a sex-specific table 2002 shown in FIG. 21. In the age group of 0 to 10 years, the occurrence probability of a crying facial expression is generally higher than that of an embarrassed facial expression. Therefore, for example, as indicated by the age group table 2001 in FIG. 21, the age group of 0 to 10 years is set such that a higher priority is given to a crying facial expression than an embarrassed facial expression.

Referring back to FIG. 20B, in S414, the captured image data is through-displayed. In S415, a facial expression evaluation value $E_i$ is calculated by using the facial expression evaluation value calculation algorithm described in the first embodiment.

In S416, the facial expression is determined by performing processing using the threshold $Th_i$ for determining a facial expression after the facial expression evaluation value $E_i$ calculated in S415 is updated based on a priority $w_i$ determined in S413.

In S417, the image sensing apparatus automatically determines whether to perform image capturing based on the facial expression determined in S416. If, for example, it is determined by referring to the facial expression detecting history that the detection frequency of the facial expression is lower than the third lowest place, the facial expression is captured as an unusual facial expression. If it is determined in S417 that image capturing is to be performed, image capturing operation is performed. After displaying the captured image in the quick review mode in S419, the system control circuit 112 stores the captured image in a nonvolatile memory card or the like via the interface 111 in S420. If it is determined in S417 that image capturing is not to be performed, the process returns to S410 to process the next image. If it is determined in S421 that automatic image capturing is complete, the automatic image capturing operation is terminated. If it is determined in S421 that automatic image capturing is not complete, the process returns to S410 to process the next image.

As described above, according to the fourth embodiment, a priority for each facial expression is determined based on an individual authentication result, an age authentication result, and a sex authentication result. This makes it possible to perform facial expression recognition specialized to individuals, ages, and sexes. Although this embodiment has exemplified the case in which the facial expression recognition apparatus 10 is applied to the image sensing apparatus 100, the facial expression recognition apparatus 10 can be applied to a personal computer to be used for image retrieval.

Fifth Embodiment

The fifth embodiment will be described next. The fifth embodiment will exemplify a case in which a preferred facial expression (first facial expression) and an unpreferred facial expression (second facial expression) as a facial expression to be captured are set in advance, and image capturing is performed based on the set facial expressions and facial expression evaluation values. Like the fourth embodiment, the fifth embodiment will exemplify a case in which the facial expression recognition apparatus 10 in the first embodiment described with reference to FIG. 3 is applied to an image sensing apparatus 100. The arrangement of the image sensing apparatus 100 in the fifth embodiment is the same as that in the fourth embodiment in FIG. 19, and hence a description will not be repeated.

Figure 23A:
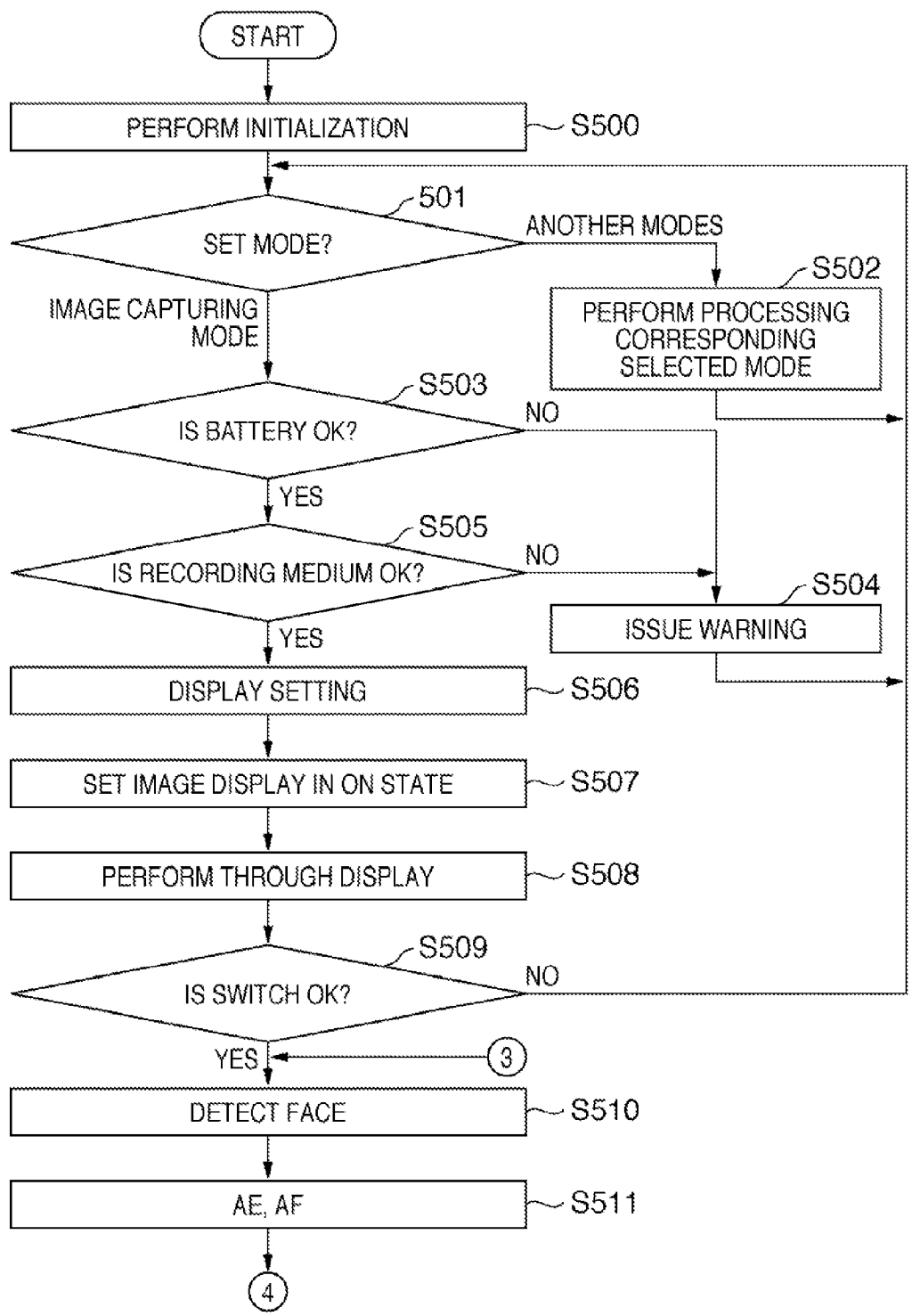
FIGS. 23A and 23B are flowcharts showing a processing sequence in an image sensing apparatus 100 according to the fifth embodiment.
Figure 23B:
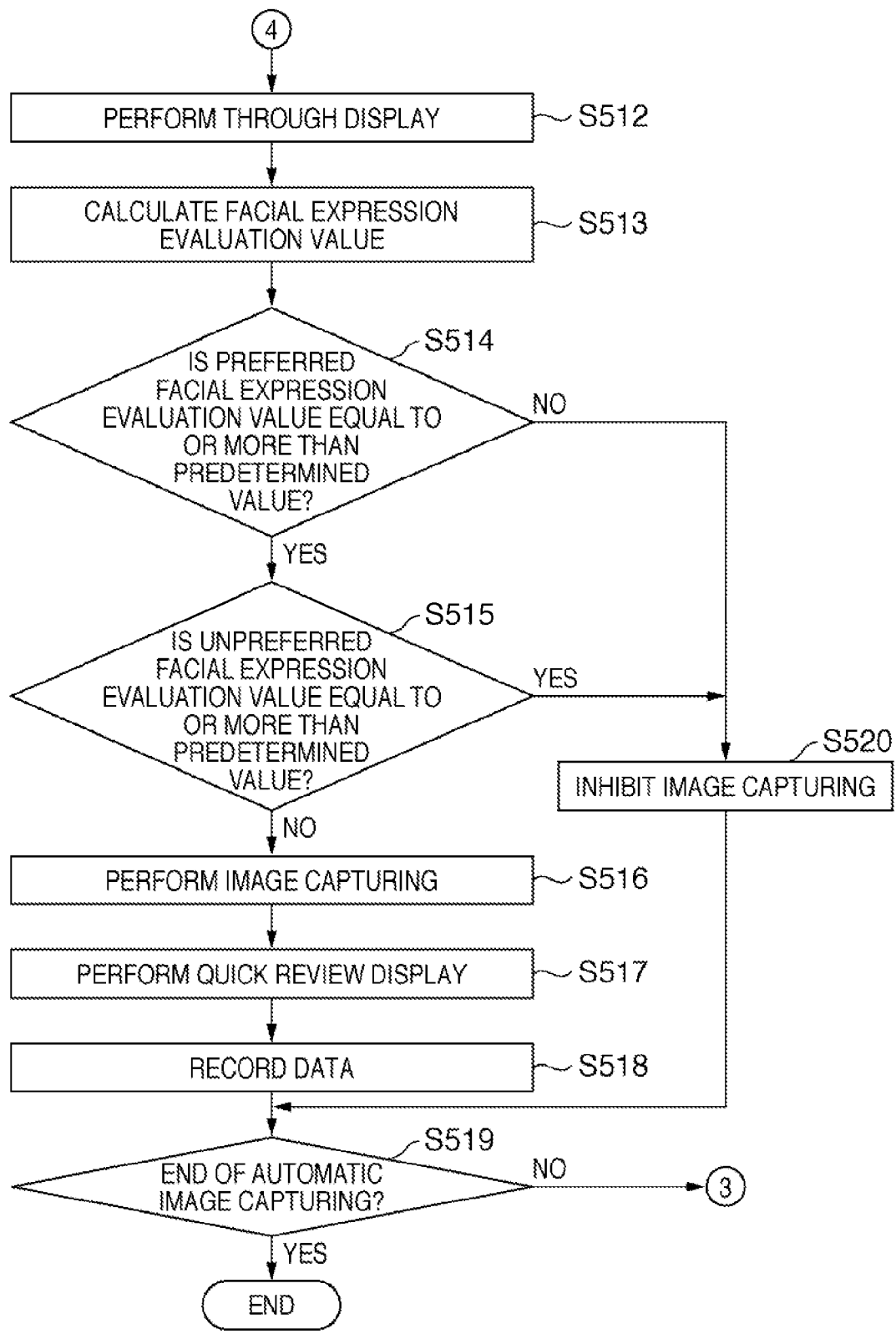

FIGS. 23A and 23B are flowcharts showing a processing sequence in the image sensing apparatus 100 according to the fifth embodiment. Note that a program which executes this processing is, for example, stored in the memory in the system control circuit 112 and executed under the control of the system control circuit 112.

This processing is started when, for example, the power supply is turned on. First of all, in S500, the system control circuit 112 initializes various flags, control variables, and the like in the internal memory.

In S501, the system control circuit 112 detects the mode set state of the image sensing apparatus 100. Assume that the user has selected a smiling facial expression as a facial expression to be captured by the user in the fifth embodiment. When a smiling facial expression is selected as a facial expression to be captured, the system control circuit 112 sets, for example, a smiling facial expression as a preferred facial expression, and an eye closed facial expression as an unpreferred facial expression. In this case, processing from S502 to S513 is the same as that from S402 to S413 in the fourth embodiment in FIGS. 20A and 20B, and hence a description will not be repeated.

In S514, the system control circuit 112 determines whether a facial expression evaluation value $E_5$ of the preferred facial expression set in S501 is more than or equal to a threshold $Th_5$ for determining a facial expression. That is, the system control circuit 112 determines whether the facial expression evaluation value $E_5$ of a smiling facial expression as the preferred facial expression is more than or equal to the threshold $Th_5$ for determining a facial expression. If the facial expression evaluation value $E_5$ of the smiling facial expression as the preferred facial expression is more than or equal to the threshold $Th_5$ for determining a facial expression, the process advances to S515.

The system control circuit 112 determines in S515 whether a facial expression evaluation value $E_6$ of a facial expression as an unpreferred facial expression is more than or equal to a threshold $Th_6$ for determining a facial expression. That is, the system control circuit 112 determines whether the facial expression evaluation value $E_6$ of the eye closed facial expression as the unpreferred facial expression is more than or equal to the threshold $Th_6$ for determining a facial expression. Note that the eye closed facial expression evaluation value $E_6$ indicates an eye closing degree. If the facial expression evaluation value $E_6$ of the eye closed facial expression as the unpreferred facial expression is smaller than the threshold $Th_6$ for determining a facial expression, the process advances to S516 to perform image capturing.

After displaying the captured image in the quick review mode in S517, the system control circuit 112 stores the image captured in S516 in a nonvolatile memory card or the like via the interface 111. Assume that the system control circuit 112 determines in S514 that the preferred facial expression evaluation value $E_5$ is not more than or equal to the threshold $Th_5$ for determining a facial expression. In this case, if the system control circuit 112 determines in S515 that the unpreferred facial expression evaluation value $E_6$ is more than or equal to the threshold $Th_6$ for determining a facial expression, image capturing is not performed in S520. That is, image capturing is performed only when the facial expression evaluation value of the smiling facial expression as the preferred facial expression exceeds a predetermined threshold (more than or equal to the threshold for determining a facial expression for the smiling facial expression), and the facial expression evaluation value of the eye closed facial expression as the unpreferred facial expression is smaller than a predetermined threshold (less than the threshold for determining a facial expression for the eye closed facial expression).

If the system control circuit 112 determines in S519 that automatic image capturing is to be terminated, the processing is terminated. Otherwise, the process advances to S510 to process the next image.

As described above, according to the fifth embodiment, even if the facial expression evaluation value of a preferred facial expression (first facial expression) is more than or equal to a predetermined value, image capturing is not performed unless the facial expression evaluation value of an unpreferred facial expression (second facial expression) is smaller than a predetermined value. With this operation, it is possible to capture only a smiling facial expression with open eyes as a smiling facial expression. This makes it possible to capture an optimal facial expression required by the user.

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, various media can be used. As another program supply method, the user establishes connection to a website on the Internet using a browser on a client computer, and downloads the computer program of the present invention from the website onto a recording medium such as a hard disk.

The functions of the aforementioned embodiments can be implemented when the computer executes the readout program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

According to the present invention, the accuracy of facial expression recognition can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Continuation of U.S. application Ser. No. 14/287,441, with a filing date of May 27, 2014, which was allowed on May 20, 2015, and which is a Continuation of U.S. application Ser. No. 12/936,227, with a filing date of Oct. 4, 2010, which is a U.S. National Phase of PCT/JP2009/057029, internationally filed on Mar. 31, 2009, and which claims the benefit of Japanese Patent Application No. 2008-101818, filed Apr. 9, 2008 which are all hereby incorporated by reference herein in their entireties.

The invention claimed is:

1. An apparatus comprising:
   an image input unit configured to input an image;
   a detection unit configured to detect a face of a person from the image input by said image input unit;
   a first judgment unit configured to judge whether the face detected by said detection unit shows a smiling face; and
   a second judgment unit configured to judge whether the face detected by said detection unit shows an eye closed face;
   wherein even if faces detected by said detection unit each have the same eye closing degree,
   said second judgment unit judges that the detected face does not show the eye closed face in a case where said first judgment unit judges that the detected face shows a first smiling face, and said second judgment unit judges that the detected face shows the eye closed face in a case where said first judgment unit judges that the detected face shows a second smiling face.

2. The apparatus according to claim 1, wherein said first judgment unit judges that a degree of the first smiling face is higher than a degree of the second smiling face.

3. The apparatus according to claim 1, further comprising a first calculation unit configured to calculate a score of the smiling face based on feature amount of an expressionless facial image prepared in advance and feature amount of the face detected by said detection unit, wherein said first judgment unit judges whether the face detected by said detection unit shows the smiling face based on the score calculated by said first calculation unit.

4. The apparatus according to claim 3, wherein a score of the first smiling face is higher than a score of the second smiling face.

5. The apparatus according to claim 3, wherein said first judgment unit judges that the detected face shows the first smiling face in a case where the score of the first smiling face is more than or equal to a predetermined first threshold value, and said first judgment unit judges that the detected face shows the second smiling face in a case where the score of the second smiling face is more than or equal to a predetermined second threshold value lower than the predetermined first threshold value.

6. The apparatus according to claim 1, further comprising a second calculation unit configured to calculate a score of the smiling face based on an eye open/closed degree, wherein said second judgment unit judges whether the face detected by said detection unit shows the eye closed face based on the score calculated by said second calculation unit.

7. The apparatus according to claim 6, further comprising an image sensing unit configured to perform image capturing in accordance with a case where said second judgment unit judges that the face detected by said detection unit shows the eye closed face.

8. An apparatus comprising:
an image input unit configured to input an image;
a detection unit configured to detect a face of a person from the image input by said image input unit;
a judgment unit configured to judge whether a facial expression of the face detected by said detection unit is classified into a category of a plurality of facial expressions including at least a smiling face and an eye closed face,
wherein said judgment unit performs judgment so that a degree of the eye closed face is decreased in accordance with an increase in a degree of the smiling face.

9. A method comprising:
inputting an image;
detecting a face of a person from the image input in the inputting step;
judging whether the face detected in the detecting step shows a smiling face; and
judging whether the face detected in the detecting step shows an eye closed face;
wherein even if faces detected in the detecting step each have the same eye closing degree,
judging that the detected face does not show the eye closed face in a case where it is judged that the detected face shows a first smiling face, and
judging that the detected face shows the eye closed face in a case where it is judged that the detected face shows a second smiling face.

10. A non-transitory computer readable storage medium storing a program for controlling a computer to execute respective steps of a method, the method comprising:
inputting an image;
detecting a face of a person from the image input in the inputting step;
judging whether the face detected in the detecting step shows a smiling face; and
judging whether the face detected in the detecting step shows an eye closed face;
wherein even if faces detected in the detecting step each have the same eye closing degree,
judging that the detected face does not show the eye closed face in a case where it is judged that the detected face shows a first smiling face, and
judging that the detected face shows the eye closed face in a case where it is judged that the detected face shows a second smiling face.

* * * * *